(12) United States Patent
Liu et al.

(10) Patent No.: US 11,534,892 B2
(45) Date of Patent: Dec. 27, 2022

(54) SYSTEMS AND METHODS FOR MAKING ABRASIVE ARTICLES

(71) Applicant: 3M INNOVATIVE PROPERTIES COMPANY, St. Paul, MN (US)

(72) Inventors: Yuyang Liu, St. Paul, MN (US); Junting Li, Woodbury, MN (US); Geoffrey I. Wilson, Woodbury, MN (US); Ernest L. Thurber, Somerset, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 859 days.

(21) Appl. No.: 16/470,578

(22) PCT Filed: Dec. 15, 2017

(86) PCT No.: PCT/US2017/066750
§ 371 (c)(1),
(2) Date: Jun. 18, 2019

(87) PCT Pub. No.: WO2018/118699
PCT Pub. Date: Jun. 28, 2018

(65) Prior Publication Data
US 2019/0337124 A1    Nov. 7, 2019

Related U.S. Application Data

(60) Provisional application No. 62/437,402, filed on Dec. 21, 2016.

(51) Int. Cl.
*B24D 11/00* (2006.01)
*B24D 18/00* (2006.01)
(Continued)

(52) U.S. Cl.
CPC ........ *B24D 11/005* (2013.01); *B24D 18/0072* (2013.01); *B24D 3/28* (2013.01); *B24D 3/346* (2013.01); *B24D 2203/00* (2013.01)

(58) Field of Classification Search
CPC .... B24D 11/005; B24D 18/0072; B24D 3/28; B24D 3/346; B24D 2203/00
See application file for complete search history.

(56) References Cited

U.S. PATENT DOCUMENTS

| 4,400,268 A | 8/1983 | Stache et al. |
| 2007/0066198 A1 | 3/2007 | Rambosek et al. |

(Continued)

FOREIGN PATENT DOCUMENTS

| KR | 100781784 | 12/2007 |
| WO | WO 2015/100020 | 7/2015 |

(Continued)

OTHER PUBLICATIONS

International Search Report for PCT International Application No. PCT/US2017/066750, dated Apr. 24, 2018, 3 pages.

*Primary Examiner* — Pegah Parvini
(74) *Attorney, Agent, or Firm* — Aleksander Medved

(57) ABSTRACT

In methods and systems of making an abrasive article, abrasive particles are loaded to a distribution tool including a plurality of upper walls defining a plurality of spacing slots, and a plurality of lower walls defining a plurality of distribution slots. The spacing slots are open to the distribution slots, which are open to a lower side of the tool. The loaded particles are spaced and distributed from the distribution tool to a major face of a backing web below the lower side and moving relative to the tool in a machine direction. The upper walls space the particles in the machine direction. The particles distributed by the lower walls undergo an orientation sequence in which each particle is oriented into a column aligned along the machine direction. The upper (Continued)

walls can be disposed oblique to the lower walls. The upper and lower walls can have pointed upper portions.

30 Claims, 12 Drawing Sheets

(51) Int. Cl.
    *B24D 3/28*           (2006.01)
    *B24D 3/34*           (2006.01)

(56) References Cited

U.S. PATENT DOCUMENTS

| | | |
|---|---|---|
| 2009/0169816 A1 | 7/2009 | Erickson et al. |
| 2010/0146867 A1 | 6/2010 | Boden et al. |
| 2010/0319269 A1 | 12/2010 | Erickson |
| 2012/0227333 A1 | 9/2012 | Adefris et al. |
| 2013/0040537 A1 | 2/2013 | Schwabel et al. |
| 2013/0125477 A1 | 5/2013 | Adefris |
| 2014/0106126 A1 | 4/2014 | Gaeta et al. |
| 2014/0290147 A1 | 10/2014 | Seth et al. |
| 2015/0224629 A1 | 8/2015 | Moren et al. |
| 2016/0289520 A1 | 10/2016 | Bujnowski et al. |

FOREIGN PATENT DOCUMENTS

| | | |
|---|---|---|
| WO | WO 2016/205267 | 12/2016 |
| WO | WO 2017/007714 | 1/2017 |
| WO | WO 2018/118690 | 6/2018 |

SYSTEMS AND METHODS FOR MAKING ABRASIVE ARTICLES

CROSS REFERENCE TO RELATED APPLICATIONS

This application is a national stage filing under 35 U.S.C. 371 of PCT/US2017/066750, filed Dec. 15, 2017, which claims the benefit of U.S. Provisional Application No. 62/437,402, filed Dec. 21, 2016, the disclosures of which incorporated by reference in their entireties herein.

BACKGROUND

The present disclosure relates to abrasive articles. More particularly, it relates to tools, systems and methods for arranging abrasive particles on a backing as part of the manufacture of an abrasive article.

In general, coated abrasive articles have an abrasive layer secured to a backing. The abrasive layer comprises abrasive particles and a binder that secures the abrasive particles to the backing. One common type of coated abrasive article has an abrasive layer comprised of a make coat or layer, a size coat or layer, and abrasive particles. In making such a coated abrasive article, a make layer precursor comprising a curable make resin is applied to a major surface of the backing. Abrasive particles are then at least partially embedded into the curable make resin, and the curable make resin is at least partially cured to adhere the abrasive particles to the major surface of the backing. A size layer precursor comprising a curable size resin is then applied over the at least partially cured curable make resin and abrasive particles, followed by curing of the curable size resin precursor, and optionally further curing of the curable make resin.

Application of the abrasive particles to a major face of a backing construction (e.g., a backing coated with a make layer precursor) is oftentimes accomplished via drop coating technique in which a bulk supply of the abrasive particles are fed through a hopper and fall onto the major face (e.g., onto or into the make layer precursor) under the force of gravity. A spatial orientation of the abrasive particles upon contacting the major face is entirely random in all directions. Alternatively, electrostatic coating (e-coat) is also well known, and generally employs an electrostatic field to propel the abrasive particles vertically against the force of gravity onto the major face onto or into the make layer precursor). With electrostatic coating, it is possible to effect the orientation of the abrasive particles in one direction such that each abrasive particle's elongated dimension is substantially erect (standing up) with respect to the backing surface. However, electrostatic coating is more expensive than drop coating, and may not be viable with all types of abrasive particles (e.g., it can be difficult to consistently electrostatically coat relatively large abrasive particles).

In light of the above, a need exists for improved systems and methods for applying abrasive particles to a backing construction as part of the manufacture of an abrasive article.

SUMMARY

Some aspects of the present disclosure are directed toward a method of making an abrasive article. The method includes loading abrasive particles to a distribution tool. The distribution tool includes a plurality of first walls defining a plurality of first slots and a plurality of second walls defining a plurality of second slots. Each of the first slots is open to a lower side of the distribution tool. Each of the second slots is open to an upper side of the plurality of first walls. The abrasive particles are spaced as they are loaded into the distribution tool using the plurality of second walls. At least a majority of the abrasive particles loaded into the distribution tool undergo a particle spacing sequence in which each abrasive particle of the at least a majority of abrasive particles enter one of the plurality of second slots, and passes through the corresponding second slot spaced from abrasive particles in an adjacent second slot. The abrasive articles are then distributed from the distribution tool on to a major face of a backing construction web located immediately below the lower side of the distribution tool and moving relative to the distribution tool. At least a majority of the abrasive particles distributed from the distribution tool undergo a particle orientation sequence in which each abrasive particle of the at least a majority of abrasive particles enters one of the plurality of first slots, passes partially through the corresponding first slot such that a first portion of the abrasive particle is beyond the lower side and in contact with the major face, and a second portion of the abrasive particle is within the first slot, and remains in simultaneous contact with at least one of the first walls and the major face for a dwell period during which the web moves relative to the distribution tool.

Other aspects of the present disclosure are directed toward a system for making an abrasive article. The system includes a distribution tool and a web feeding device. The distribution tool includes a plurality of upper walls defining a plurality of spacing slots having an entrance side and a lower side, and a plurality of lower walls defining a plurality of distribution slots having an upper side and an exit side. The web feeding device is configured to manipulate a backing construction web in a machine direction immediately below the exit side of the distribution tool. Each of the distribution slots defines a first length substantially parallel to the machine direction. Each of the spacing slots defines a second length oblique to the machine direction.

DETAILED DESCRIPTION

Stacked Grid Embodiment

Figure 1:
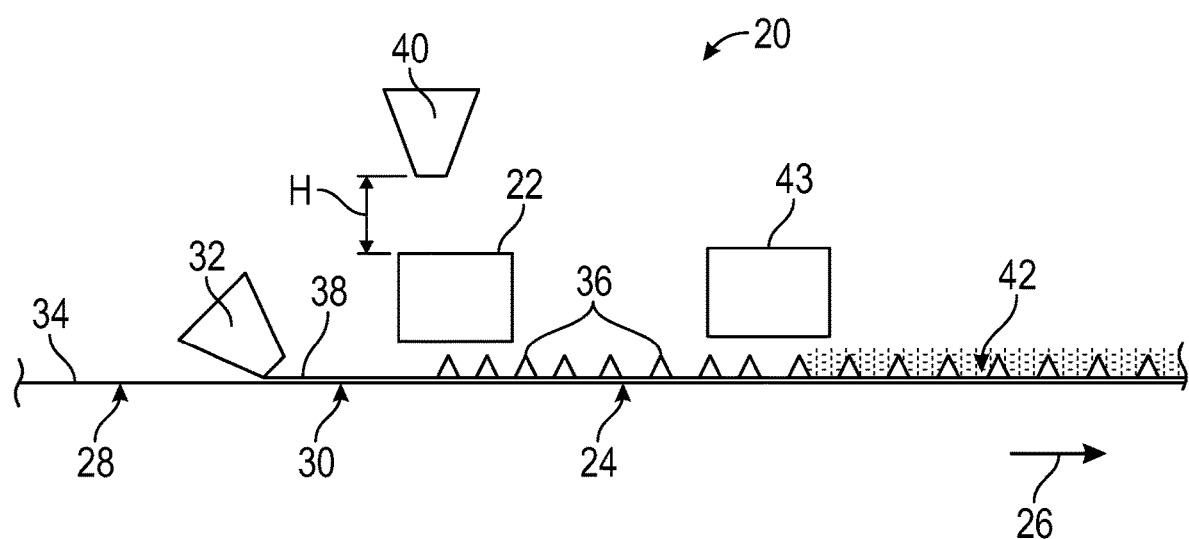
FIG. 1 is a simplified illustration of a portion of a system for manufacturing abrasive articles in accordance with principles of the present disclosure, the system including a distribution tool having a grid of a plurality of layers of walls and slots disposed above a conveyor.

Aspects of the present disclosure relate to tools, systems and methods for manufacturing abrasive articles, and in particular devices and methods for applying abrasive particles to a backing construction. As a point of reference, FIG. 1 illustrates portions of a system 20 for manufacturing abrasive articles in accordance with principles of the present disclosure, including a distribution device 22 along with other components or devices commonly employed in the manufacture of abrasive articles. For example, the manufacture of abrasive articles conventionally includes structures and mechanisms (e.g., rollers, conveyor belts, etc.) for moving a backing construction web 24 along a path of travel or machine direction 26. The backing construction web 24 can assume various forms, and in some embodiments includes a backing 28 to which a make coat precursor resin 30 (or other resin or adhesive) has been applied. For example, with the non-limiting arrangement of FIG. 1, the backing 28 is advanced past a coater 32 that applies the make coat precursor resin 30 on a major surface 34 of the backing 28 thereby creating the backing construction web 24 (e.g., a coated backing). In other embodiments, multiple coatings can be applied to the backing 28 to generate the backing construction web 24 as delivered to the distribution device 22; in yet other embodiments, the backing construction web 24 consists of the backing 28 alone (i.e., prior to interacting with the distribution device 22, the backing 28 is not subjected to a resin coating operation). Abrasive particles 36 (a size of which is greatly exaggerated in FIG. 1 for ease of understanding) are applied to a major face 38 of the backing construction web 24 by the distribution device 22 that otherwise distributes the abrasive particles 36 from a supply 40 as described below. After application of the abrasive particles 36, the hacking construction web 24 exits the distribution device 22 and is optionally subjected to further processing (e.g., application of a size coat 42, application of additional abrasive particles by conventional means (e.g., e-coat), application of a grinding aid, application of a supersize coat, curing, cutting, etc.), such as from device 43, to produce a final abrasive article, such as a coated abrasive article.

Supply 40 can be positioned a height H above distribution device 22. The magnitude of height H can affect the efficiency with which particles are received in distribution device 22. For example, sometimes particles can impact distribution device 22 after passing out of supply 40 and can bounce out of distribution device 22. These particles are either lost from system 20, thereby producing waste, or land on major face 38 and can result in improperly aligned particles that can potentially decrease the abrasive efficiency of the coated abrasive article. Thus, it has been found that fewer particles can be lost from distribution device 22 if supply 40 is brought closer to distribution device 22 to reduce the magnitude of height H. In particular, bringing supply 40 closer to distribution device 22 can reduce the linear momentum of the particles, thereby reducing their speed upon contact with distribution device 22. This can lower the reactive impact force on the particle, which can reduce the particles from "jumping out" of distribution device 22. In other examples, the mass of the particles can be decreased to reduce the linear momentum of the particles.

The distribution device 22 is configured to effectuate gross biased orientation and alignment of at least a majority of the abrasive particles 36 as applied and subsequently bonded to the major face 38. With this in mind, portions of one embodiment of a distribution tool 44 and a distribution tool 50 in accordance with principles of the present disclosure and useful with or as the distribution device 22 (FIG. 1) are shown in simplified form in FIG. 2A-2C and 3A-3C, respectively.

The distribution devices described herein, including distribution device 22, distribution tool 44, distribution tool 50 and others, can include multiple tooling layers positioned adjacent each other. Each tooling layer can have a plurality of walls and slots that are oriented at an angle relative to each other. In a two-layer embodiment, a top tooling layer can be configured to ensure an even or semi-regular spacing or distribution of the particles, and bottom tooling layer can be configured to ensure a common orientation to the particles. Such a two-layer distribution device can be embodied in a stacked configuration, as discussed with reference to FIGS. 2A-2C and 3A-3C, or a cylindrical drum embodiment, as discussed with reference to FIGS. 8-11.

Figure 2A:
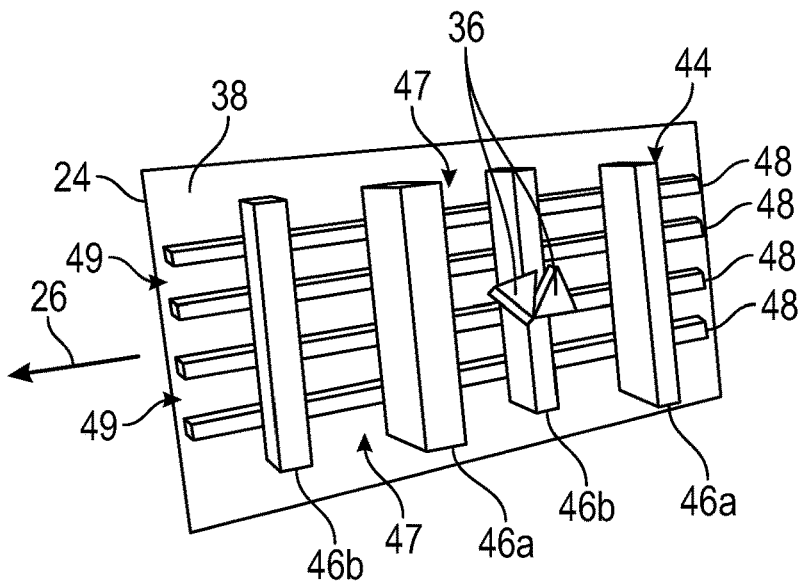
FIG. 2A is a perspective view of a distribution tool having two layers of walls and slots for spacing and aligning particles to be attached to a substrate.
Figure 2B:
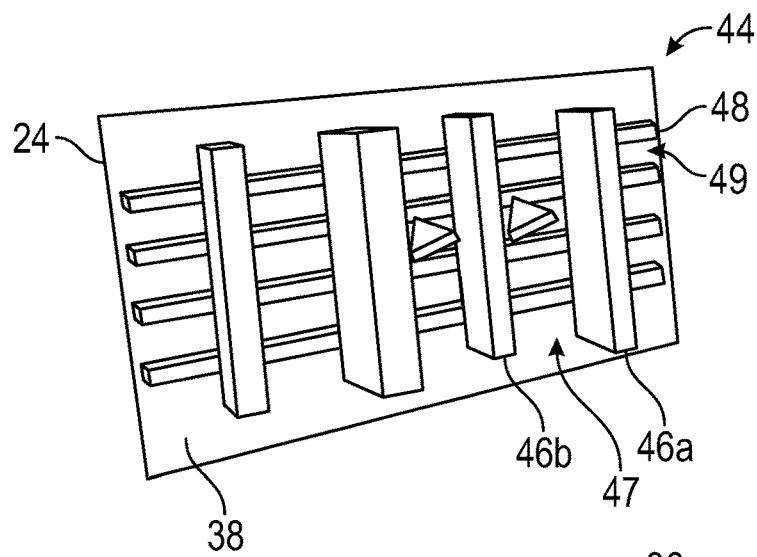
FIG. 2B is a perspective view of the distribution tool of FIG. 2A with the particles falling through the two layers of walls and slots toward the substrate.

FIG. 2A is a perspective view of distribution tool 44 having two layers comprising walls 46 and 48, which include slots 47 and 49, respectively, for aligning particles 36 to be attached to major face 38 of web 24. Web 24 is configured to move in direction 26. Walls 48 are disposed parallel to direction 26. Walls 46 can be disposed perpendicular to direction 26. Walls 46 can be configured to have different sizes. For example, walls 46A and be larger than walls 46B. Walls 46A and 46B can be disposed in alternating fashion to, for example, prevent particles 36 from landing on walls 46 and not moving through slots 47. Walls 46 are disposed on top of walls 46 and are configured to receive particles 36 from supply 40 before walls 48. FIG. 2B is a perspective view of the distribution tool of FIG. 2A with the particles falling through the two layers of walls and slots.

FIG. 2B is a perspective view of distribution tool 44 of FIG. 2A with particles 36 falling though walls 46 and walls 48. Walls 46 are configured to distribute particles along the length of walls 48. For example, walls 46 can push particles 36 to either side of themselves to prevent clumping of particles 36. Walls 46 can, thus, be spaced apart at, an interval (to form slots 47) that is as wide or wider than the widest dimension of particles 36. After passing through walls 46, particles 36 engage walls 48. Walls 48 are configured to align particles 36 in a common orientation in columns thrilled by each slot 49. For example, walls 48 can only permit particles to pass through walls 48 in one orientation. Walls 48 can, thus, be spaced apart at an interval (to form slots 49) that is just wider than the narrowest dimension of particles 36.

Figure 2C:
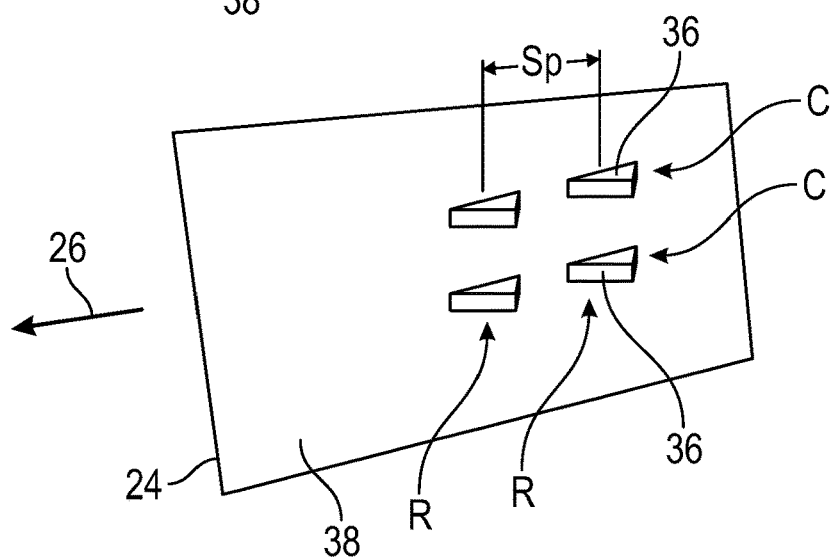
FIG. 2C is a perspective view of the substrate of FIG. 2B showing the particles distributed in spaced rows and columns.

FIG. 2C is a perspective view of web 24 of FIG. 2B showing particles 36 distributed in rows R and columns C. Walls 46 can push particles into spacing intervals aligned with direction 26. Different sized walls 46A and 46B can produce different spacing intervals. Walls 48 can rotate particles 36 such that consecutive particles 36 in direction 26 have the same orientation. For example, particles 36 can be oriented such that abrasive edges are aligned with direction 26. Walls 46 and 48 can have pointed upper portions to facilitate particles 36 moving through slots 47 and 49.

Figure 3A:
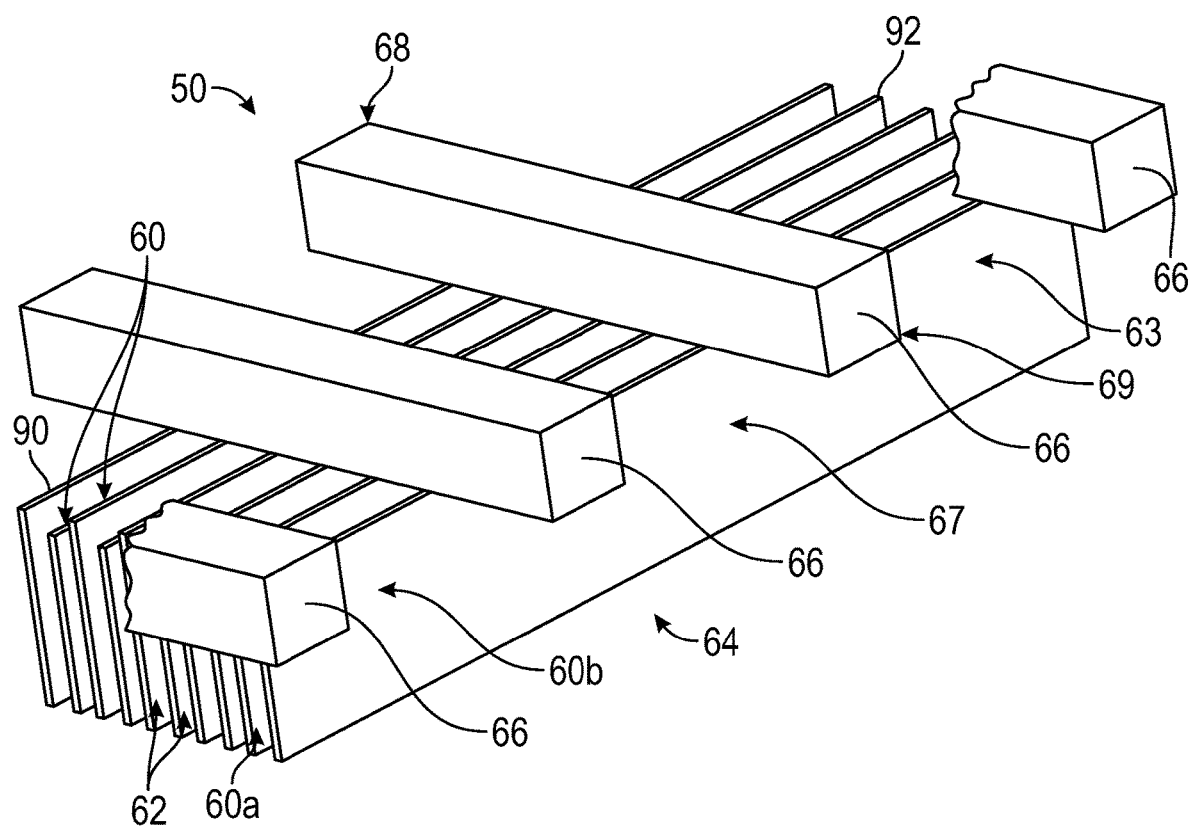
FIG. 3A is a perspective view of a portion of a distribution tool in accordance with principles of the present disclosure and useful with the system of FIG. 1.
Figure 3B:
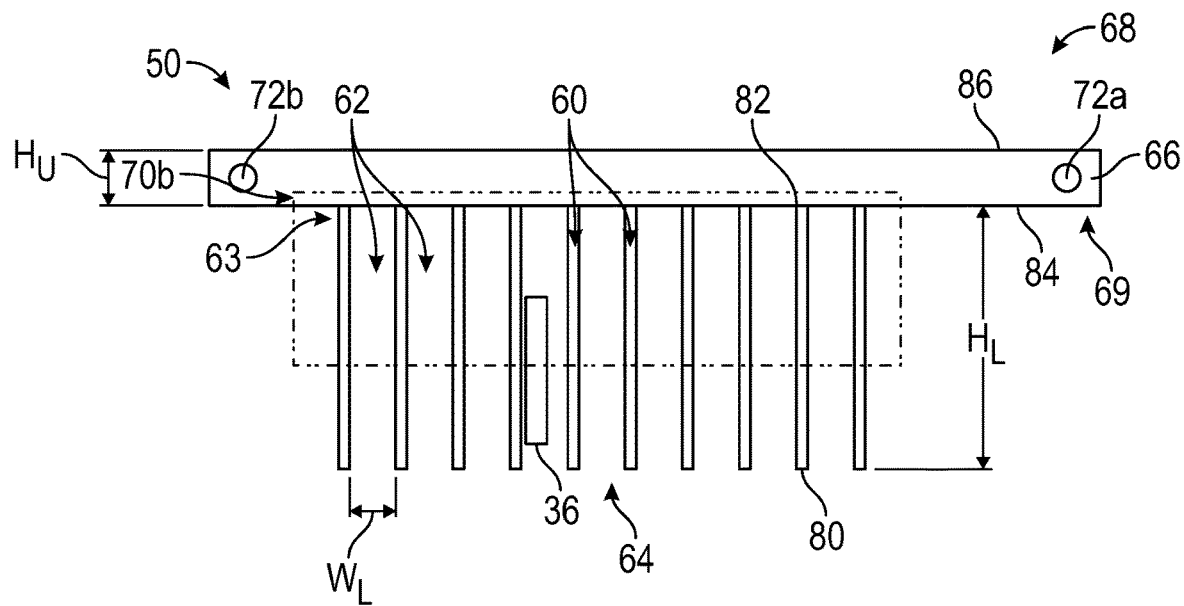
FIG. 3B is an end view of the tool of FIG. 2A showing the height of upper and lower walls and spacing between lower walls.
Figure 3C:
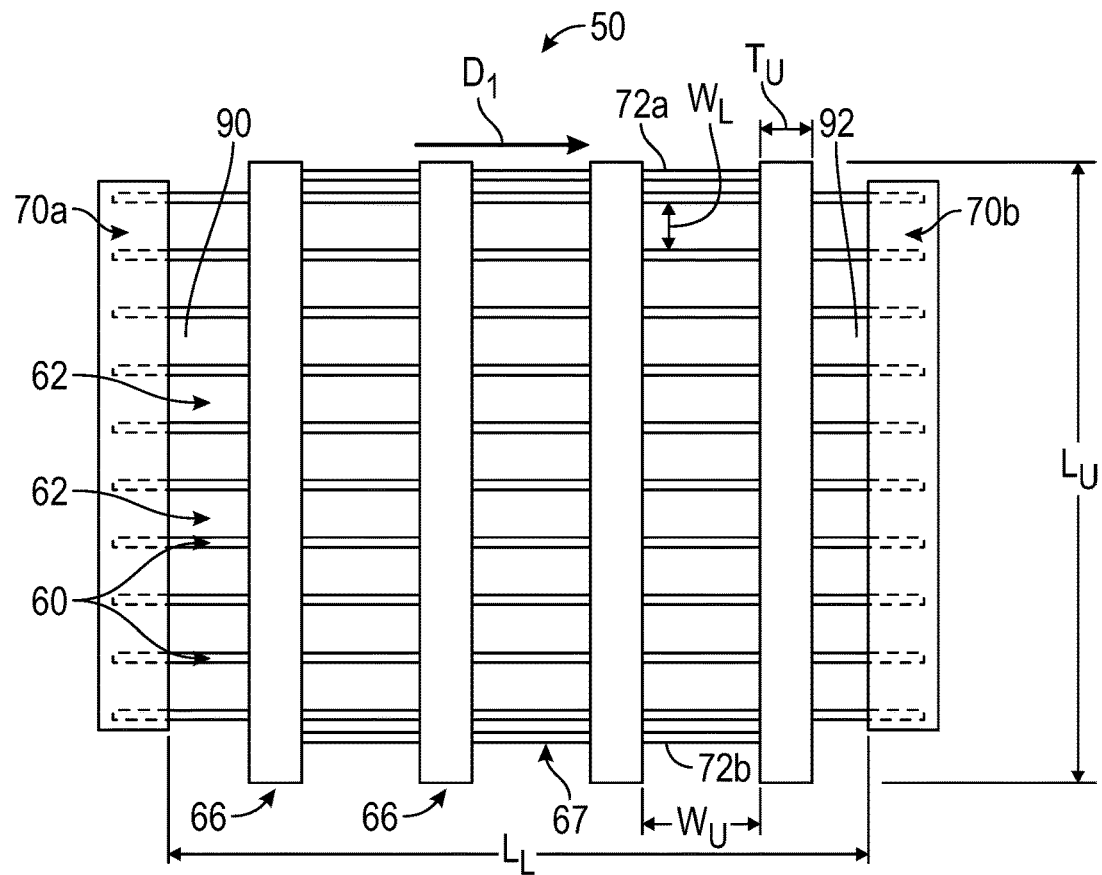
FIG. 3C is a top view of the tool of FIG. 2A showing the spacing between the upper and lower walls.

FIG. 3A is a perspective view of a portion of distribution tool 50 in accordance with principles of the present disclosure and useful with system 20 of FIG. 1. FIG. 3B is an end view of the tool 50 of FIG. 2A showing the height of upper and lower walls 66, 60 and spacing between lower walls 60. FIG. 3C is a top view of the tool 50 of FIG. 2A showing the spacing between upper walls 66 and lower walls 60.

In general terms, the distribution tool 50 includes a plurality of lower walls 60 forming lower slots 62 between upper side 63 and lower side 64 and upper walls 66 forming slots 67 between upper side 68 and lower side 69. Walls 60 are spaced from one another such that one of slots 62 is defined between immediately adjacent ones of the walls 60. Walls 66 are spaced from one another such that one of slots 67 is defined between immediately adjacent one of the walls 66. For ease of explanation, a size of the slots 62 and 67 relative to a size of the walls 60 and 66, respectively, is exaggerated in the views. The distribution tool 50 is configured to distribute abrasive particles (not shown) at a lower side 64 (referenced generally in FIGS. 3A and 3B) thereof in a manner that grossly orients and aligns the abrasive particles.

For example, and as described in greater detail below, the walls 66 are arranged such that the slots 67 have a substantially similar width $W_U$ (e.g., the width $W_U$ of the slots 67 varies from one another by no more than 10%) that is selected in accordance with expected nominal dimensions of the abrasive particles so as to grossly bias the abrasive particles to a linear spacing at the lower side 69. Slots 67 can also have height $H_U$ and length $L_U$.

Also, the walls 60 are arranged such that the slots 62 have a substantially similar width $W_L$ (e.g., the width $W_L$ of the slots 62 varies from one another by no more than 10%) that is selected in accordance with expected nominal dimensions of the abrasive particles so as to grossly bias the abrasive particles to a spatial orientation at the lower side 64. Slots 62 can also have height $H_L$ and length $L_L$.

The walls 66 are elongated, substantially planar (e.g., within 10% of a truly planar construction) bodies formed of a relatively rigid material (e.g., metal, plastic, ceramic, etc.). The walls 66 can be maintained relative to one another in various fashions. For example, the distribution tool 50 can include mounting bodies 72a, 72b assembled to opposite ends, respectively, of each of the walls 66. As a point of reference, the mounting bodies 72a, 72b are illustrated in FIG. 3C and are omitted from the view of FIG. 3A; mounting bodies 72a and 72b are shown with phantom lines in FIG. 3B. Regardless of an exact construction, the mounting bodies 72a, 72b maintain the walls 60 in a substantially parallel manner (e.g., the walls 60 are arranged to be within 10% of a truly parallel relationship with one another). Due to their substantially rigid nature, the walls 62 self-maintain the substantially parallel arrangement dictated by the mounting bodies 72a, 72b upon final assembly and during use.

The walls 60 are elongated, substantially planar (e.g., within 10% of a truly planar construction) bodies formed of a relatively rigid material (e.g., metal, plastic, ceramic, etc.). The walls 60 can be maintained relative to one another in various fashions. For example, the distribution tool 50 can include mounting bodies 70a, 70b assembled to opposite ends, respectively, of each of the walls 60. As a point of reference, the mounting bodies 70a, 70b are illustrated in FIG. 3C and are omitted from the view of FIG. 3A; one of the mounting bodies 70b is shown with phantom lines in FIG. 3B. Regardless of an exact construction, the mounting bodies 70a, 70b maintain the walls 60 in a substantially parallel manner (e.g., the walls 60 are arranged to be within 10% of a truly parallel relationship with one another). Due to their substantially rigid nature, the walls 60 self-maintain the substantially parallel arrangement dictated by the mounting bodies 70a, 70b upon final assembly and during use.

The mounting bodies 72a, 72b may cover, pass through or encompass a portion of each of the walls 66, with a linear distance between the mounting bodies 72a, 72b serving to define an effective length of each of the walls 66, which corresponds to the length $L_U$ of each of the slots 67. The length $L_U$ of each of the slots 67 is selected in accordance with expected nominal dimensions of the abrasive particles (not shown) with which the distribution tool 50 will be used as described in greater detail below, including the slot length $L_U$ being sufficient to simultaneously receive a multiplicity of the abrasive particles.

The mounting bodies 70a, 70b may cover, pass through or encompass a portion of each of the walls 60, with a linear distance between the mounting bodies 70a, 70b serving to define an effective length of each of the walls 60, which corresponds to the length $L_L$ of each of the slots 62. The length $L_L$ of each of the slots 62 is selected in accordance with expected nominal dimensions of the abrasive particles (not shown) with which the distribution tool 50 will be used as described in greater detail below, including the slot length $L_L$ being sufficient to simultaneously receive a multiplicity of the abrasive particles.

Each of the walls 66 has a height defined as the linear distance between opposing, first and second edges 84, 86 (FIG. 3B), which defines height $H_U$ of slots 67. The elongated shape of each of the walls 66 includes the effective wall length being greater than the corresponding wall height. A depth of each slot 67 is defined by the height(s) $H_U$ of the immediately adjacent walls 66 defining the slot 67, and is selected in accordance with expected nominal dimensions of the abrasive particles (not shown) with which the distribution tool 50 will be used, as well as other end-use parameters, as described below.

Each of the walls 60 has a height defined as the linear distance between opposing, first and second edges 80, 82 (FIG. 3B), which defines height $H_L$ of slots 62. The elongated shape of each of the walls 60 includes the effective wall length being greater than the corresponding wall height. A depth of each slot 62 is defined by the height(s) $H_L$ of the immediately adjacent walls 60 defining the slot 62, and is selected in accordance with expected nominal dimensions of the abrasive particles (not shown) with which the distribution tool 50 will be used, as well as other end-use parameters, as described below.

In some embodiments, the wall heights are not identical. For example, and as best reflected by FIG. 3B, the plurality of walls 60 can include alternately located first walls and second walls, wherein the height of the first walls can be greater than the height of the second walls. The walls can be arranged such that the corresponding first edges 80 are all substantially aligned with one another at the lower side 64. Due to the differing heights, then, the second edge 82 of the second walls will be off-set from the second edge 82 of the first walls in a direction of the lower side 64. The alternating heights, and in particular the alternating off-set spatial arrangement of the first edges 80 relative to one another, assists in encouraging abrasive particles to enter the slots 62, such as by preventing particles from becoming hung-up on or "bridging" walls 60. Alternatively, three or more differing wall heights can be incorporated into the distribution tool 50; in yet other embodiments, the walls 60 can all have an identical height, as shown.

Walls 60 of distribution device 22 can be configured similarly as those described in greater detail in U.S. Provisional Patent Application No. 62/182,077 to Wilson (filed Jun. 19, 2015), the content of which is hereby incorporated by this reference in its entirety. As such, distribution device 22 is similar to the distribution device described in the application to '077 application to Wilson with the addition of walls 66. Walls 66 can be configured to control entry of particles into walls 60.

The distribution tool 50 is configured such that upon final assembly and use as part of the abrasive article manufacturing system 20 (FIG. 1), abrasive particles (e.g., particles 36 of FIGS. 2A-2C) will become loaded into the slots 67 and 62, and subsequently be caused to move relative to the slots 62 in a direction of the slot length $L_L$. Thus, the distribution tool 50 can be viewed has providing a length direction $D_L$, commensurate with the slot lengths $L_L$ from an entrance side 90 to an exit side 92. Slots 67 can cause the particles to be spaced along length direction $D_L$ be effectively breaking up length $L_L$ of slots 62 into smaller segments. FIG. 3B is an end view of the exit side 92 and reflects that the mounting body 70b (otherwise assembled at the exit side 92) terminates above (relative to the orientation of FIG. 3B) the first edge 80 of the walls 60. In other words, the mounting body 70b does not extend to the lower side 64 of the distribution tool 50, and a portion of the each of the slots 62 is open at the exit side 92 relative to the mounting body 70b in order to, for example, assist in standing the particles onto major face 38 (FIG. 1). The mounting body 70a at the entrance side 90 may or may not have a similar relationship relative to the first edges 80, and can alternatively extend to the lower side 64.

While the distribution tool 50 is illustrated as including ten of the walls 60 and four of walls 66, any other number, either greater or lesser, is equally acceptable. In more general terms, the number of walls 60 and 66 provided with the distribution tool 50 is selected as a function of the desired slot widths $W_U$ and $W_L$ and a dimension (e.g., cross-web width) of the backing construction web 24 (FIG. 1). In yet other embodiments, the distribution device 22 (FIG. 1) can include two or more of the distribution tools 50 assembled in series to a frame or similar structure.

Figure 4:
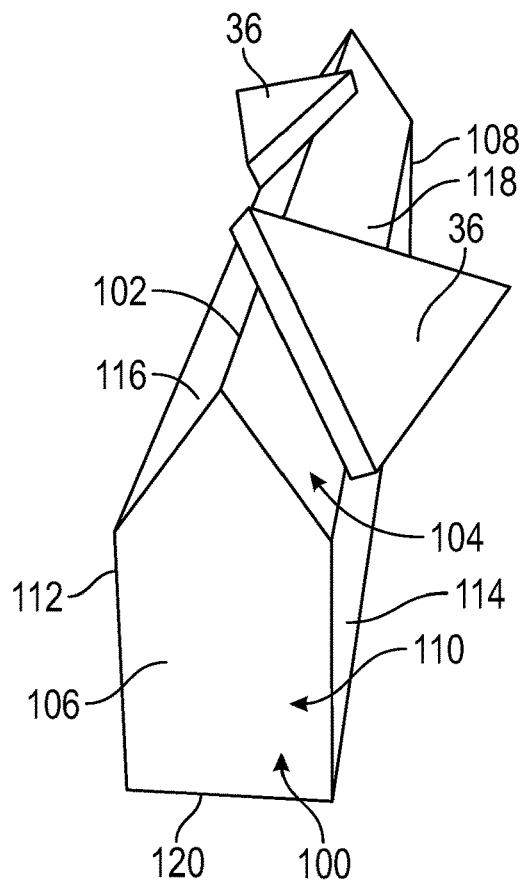
FIG. 4 is a perspective view of an exemplary wall that can be used in the distribution tools of the present disclosure to form slots, the wall having an edge extending along an upper portion.

FIG. 4 is a perspective view of an exemplary wall 100 having edge 102 extending along upper portion 104 that can be used in the distribution tools, such as distribution device 22 and distribution tools 44 and 55, of the present disclosure to form slots between adjacent walls 100. Wall 100 can be used as an upper tooling or a lower tooling in a distribution device of the present disclosure.

Wall 100 can extend from first end 106 to second end 108. Upper portion 104 can extend from lower portion 110. In the described embodiment, lower portion 110 comprises an elongate body having a rectilinear cross-section and upper portion 104 comprises an elongate body having a triangular cross-section. Edge 102 can comprise one of the points of the triangular cross-section and can extend from first end 106 to second end 108. The triangular cross-section can be formed from an equilateral triangle such that edge 102 is positioned in the middle of upper portion 104 and lower portion 110. In other words, edge 102 can be positioned halfway between first surface 112 and second surface 114. However, edge 102 can be positioned to align with either first surface 112 or second surface 114, such as by having an right-triangle cross-sectional shape. For example, edge 102 can be positioned to align with first surface 112 if path of travel or machine direction 26 extends from first surface 112 toward second surface 114 in order to facilitate particles 36 moving in machine direction 26.

Although described with particular geometries, upper portion 104 and lower portion 110 can have other shapes, sizes and proportions. Additionally, in other examples, wall 100 can be fabricated without lower portion 110 such that only a triangular portion having edge 102 is produced, as shown by walls 138 in FIG. 5.

Edge 102 facilitates movement of particles 36 to one side or the other of wall 100. Edge 102 can eliminate a flat surface on top of wall 100 that particles 36 may come to rest upon. Upper portion 104 can include side surfaces 116 and 118 that extend downward from edge 102 toward lower portion 110. Side surface 116 and 118 can be positioned to slope downward to guide particles 36 toward bottom surface 120 of wall 100. Bottom surface 120 can face toward another tooling layer or a backing, such as backing construction web 24.

Figure 5:
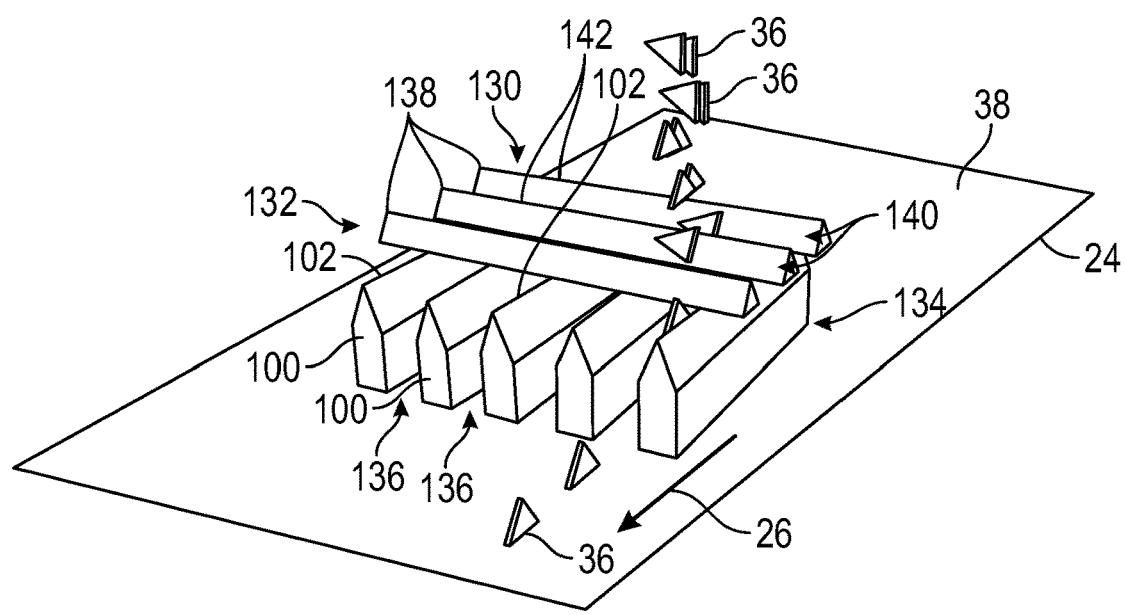
FIG. 5 is a perspective view of a distribution tool including upper and lower walls that include edges extending along upper portions of the walls as shown in FIG. 4.

FIG. 5 is a perspective view of distribution tool 130 including upper tooling 132 and lower tooling 134, each having walls that include edges extending along upper portions of the walls. Upper tooling 132 is positioned on top of lower tooling 134, which is positioned above major face 38 of web 24. Lower tooling 132 can include a plurality of walls 100 of FIG. 4 aligned to form slots 136. Upper tooling 134 can include a plurality of walls 138 aligned to form slots 140. Walls 138 can be similar to upper portions 104 of walls 100 of FIG. 4. Walls 100 can include edges 102 and walls 138 can include edges 142.

Walls 138 extend transverse to machine direction 26. In the depicted example, walls 138 are perpendicular to machine direction 26. However, in other embodiments, walls 138 can extend oblique to machine direction 26, as discussed with reference to FIGS. 6A and 6B. Walls 138 are configured to space particles 36 along machine direction 26. Particles 36 can fall onto walls 138 in random orientations.

Edges 142 can bias particles 36 toward one side or the other of walls 138 and into slots 140, thereby intermittently interrupting distribution of particles 36 to slots 136. Particles 36 can fall between walls 138 into slots 140 and onto lower tooling 134 at intervals approximating rows R (FIG. 2C) along machine direction 26 approximately equal to the width of walls 138, as discussed below with reference to FIGS. 7A and 7B.

Walls 100 extend parallel to machine direction 26. Particles 36 can fall onto walls 100 in random orientations. Edges 102 can bias particles 36 toward one side or the other of walls 100 and into slots 136. Walls 100 are configured to orient particles 36 into a preferred orientation. In the depicted example, the preferred orientation positions particles 36 such that the major plane defining each particle is parallel to machine direction 26. Such an orientation can facilitate the cutting edges of particles 36 being aligned in a uniform direction. Particles 36 can fall between walls 100 into slots 136 and onto major face 38 in lines approximating columns C (FIG. 2C) spaced apart perpendicular to machine direction 26. The columns can be spaced apart in intervals approximately equal to the width of walls 100, as discussed below with reference to FIGS. 7A and 7B.

Figure 6A:
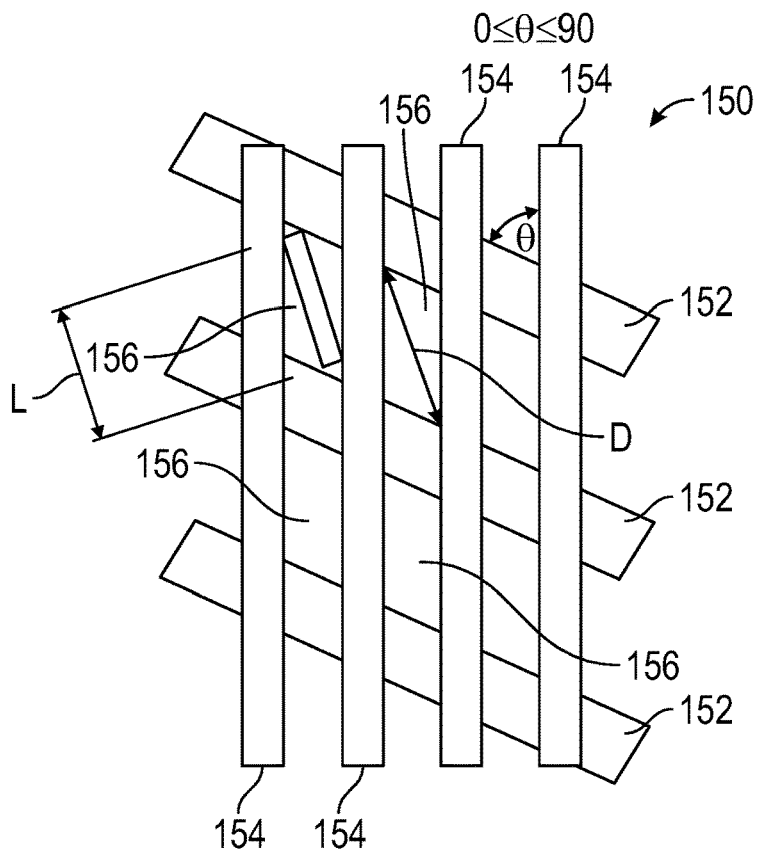
FIG. 6A is a top view of a distribution tool having upper walls disposed at an angle relative to the orientation of lower walls.
Figure 6B:
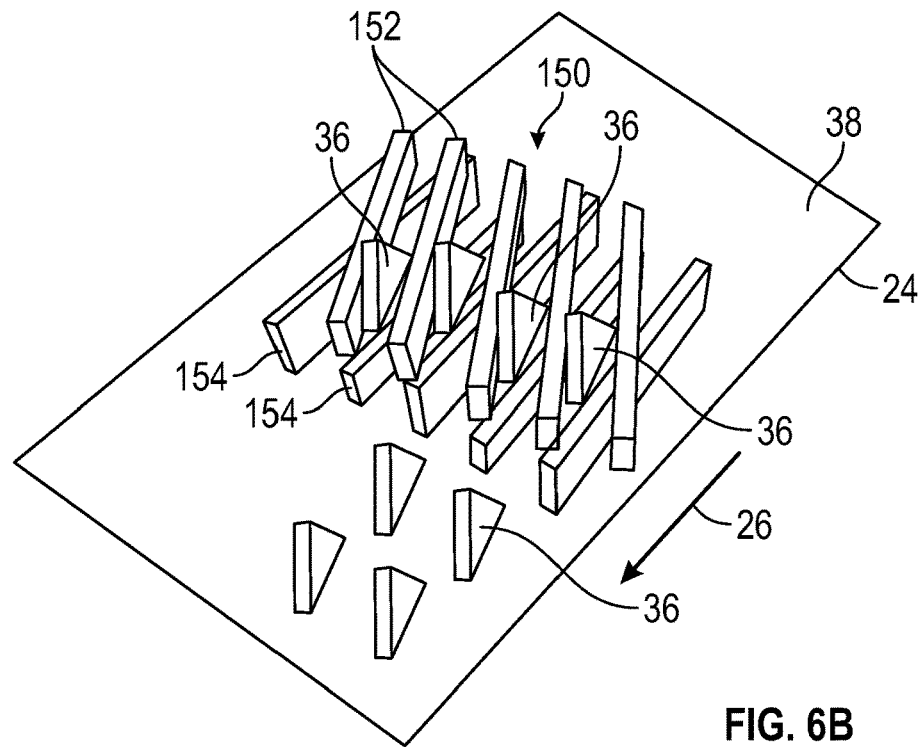
FIG. 6B is a perspective view of the distribution tool of FIG. 6A showing particles passing through the upper and lower walls.

FIG. 6A is a top view of distribution tool 150 having upper walls 152 disposed at an angle θ relative to the orientation of lower walls 154. FIG. 69 is a perspective view of distribution tool 150 of FIG. 6A showing particles 36 passing through upper walls 152 and lower walls 154.

As discussed generally herein, lower walls 154 can be oriented to be parallel to machine direction 26. Upper walls 152 can be positioned above lower walls 154 at angle θ. In various embodiments, angle θ can be equal to or greater than 0° and equal to or less than 90° (0≤θ≥90). However, at angle θ of zero, upper walls 152 would provide no orientation of particles 36 and would simply comprise extensions of walls 154. Walls 154 and walls 152 can form chutes 156 through which particles 36 can fall down onto major face 38. In the orientation shown in FIGS. 6A and 69, chutes 156 can have a parallelogram shape with a major dimension D. Major dimension D can be configured to be the same as or approximately larger than the length L of particle 36, as shown in FIG. 6A, so that particles 36 fall through chutes 156 so as to be disposed along major dimension D. As such, the cutting edges of particles 36 can be oriented to be oblique to machine direction 26.

Figure 7A:
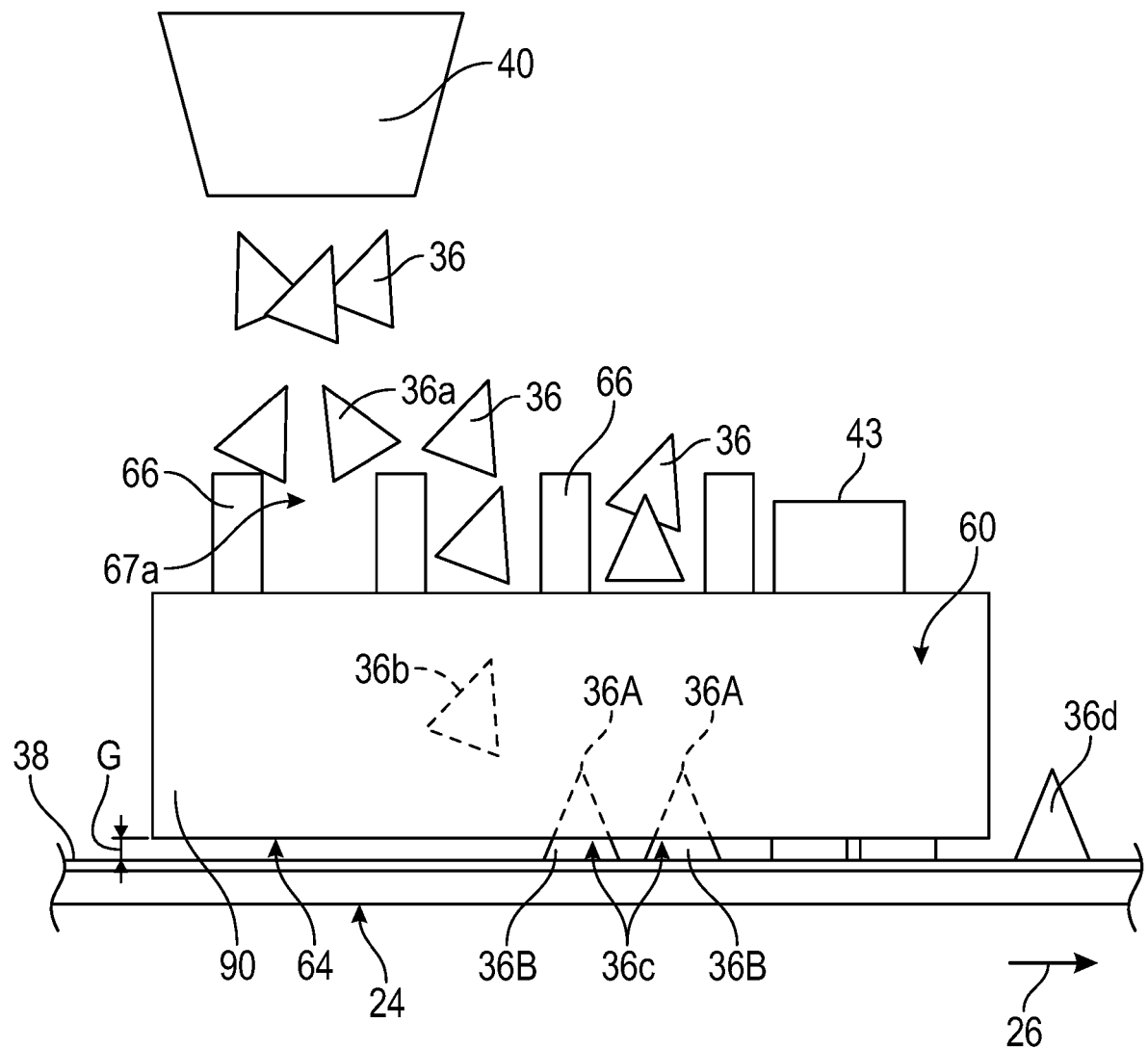
FIG. 7A is a side view of the distribution tool of FIGS. 3A-3C as part of a system for manufacturing abrasive articles and distributing abrasive particles on to a web.
Figure 7B:
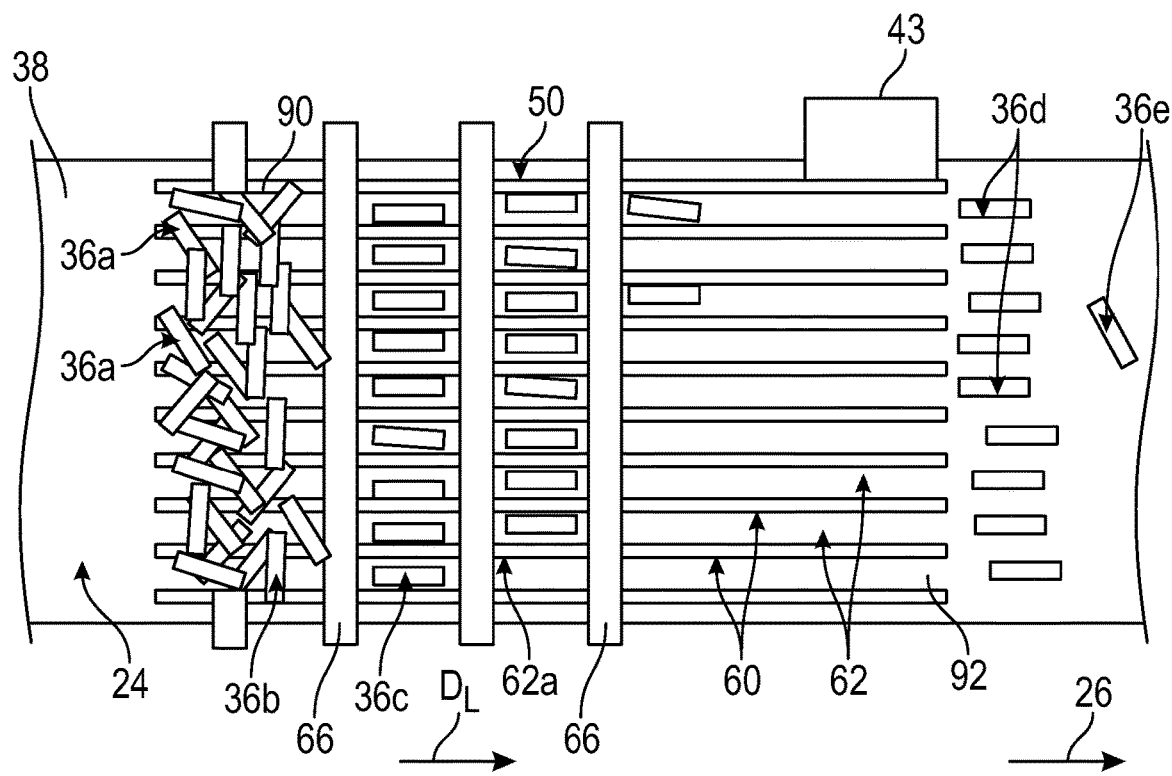
FIG. 7B is a top view of the arrangement of FIG. 7A showing particles passing into the upper and lower walls.

FIG. 7A is a side view of distribution tool 50 of FIGS. 3A-3C as part of a system for manufacturing abrasive articles and distributing abrasive particles 36 on to web 24. FIG. 7B is a top view of the arrangement of FIG. 7A showing particles 36 passing into upper walls 66 and lower walls 60.

Incorporation of the distribution tool 50 as part of the abrasive article manufacturing system 20 is generally reflected by FIGS. 7A and 79. The distribution tool 50 is located immediately adjacent (e.g., slight above by a distance described in greater detail below) the backing construction web 24. The elongated walls 60 (and thus the slots 62) are substantially aligned (e.g., within 10% of a truly aligned relationship) with the machine direction 26 (e.g., the length direction $D_L$ is substantially aligned or parallel with (e.g., within 10% of a truly aligned or parallel relationship) the machine direction 26. Walls 66 (and thus slots 67) are substantially aligned (e.g., within 10% of a truly aligned relationship) perpendicular to the machine direction 26.

During use, a supply 40 (referenced generally) of the abrasive particles 36 is loaded onto the distribution tool 50 at or adjacent the entrance side 90. Individual ones of the abrasive particles 36 will enter a respective one of the slots 67 between walls 66 and slots 62 between walls 60 only upon achieving a gross spacing and gross spatial orientation dictated by dimensions of the slots 67 and slots 62. For example, a first abrasive particle 36a in FIG. 4A is spatially positioned so as to enter the slot 67a. As a point of reference, loading of the supply 40 can include pouring or funneling (e.g., via vibratory feeder, belt driven drop coater, etc.) a large number of the abrasive particles 36 on to the distribution tool 50 under the force of gravity, with individual ones of the so-loaded abrasive particles 36 randomly assuming any spatial orientation. As the individual abrasive particles 36 repeatedly contact one or more of the walls 66, they deflect and assume a spatial orientation for entering into slots 67. Slots 67 distribute particles along a spacing for entering into slots 62 to break up placement of particles 36 onto major face 38. As particles 36 contact one or more of the walls 60, they deflect and assume a new spatial orientation, eventually becoming generally aligned with and assuming a spatial orientation appropriate for entering one of the slots 62. To assist in promoting the gross alignment and orientation, the distribution device 22 (FIG. 1) can include device 43 configured as a vibration device connected to the distribution tool 50, causing the abrasive particles 36 to vibrate around on surfaces of the distribution tool 50 until they obtain a suitable orientation and fall through one of the slots 67 and one of the slots 62. Where provided, the direction of vibration can be in a plane of the walls 60; random vibration may reduce the mass flow rate of the abrasive particles 36 through the distribution tool 50 and may knock many of the applied abrasive particles 36 over as they exit the distribution tool 50. Walls 66 can be are alternately off-set (in the height direction) from one another, or spaced from one another to prevent abrasive particles 36 from assuming a spatial orientation resulting in "bridging" of the abrasive particles 36 at the top of the distribution tool 50 and increasing the mass flow rate of the abrasive particles 36 through the distribution tool 50. Regardless, a large number of abrasive particles 36 can be disposed within individual one of the slots 67 and slots 62 at any one point in time.

Once a necessary spacing is achieved from slot 67, the so-arranged abrasive particle 36a passes through the corresponding slot 67, falls on to walls 60 to fall into one of slots 62 (and becomes particle 36b). Slots 62 apply a spatial orientation to particle 36b. Once a necessary spatial orientation is achieved, the so-arranged abrasive particle 36b passes through the corresponding slot 62 (and becomes particle 36c), falls on to the backing construction web 24 and is at least partially bonded thereto (e.g., the second abrasive particle 36b identified in FIG. 4B). The lower side 64 of the distribution tool 50 is spaced from the backing construction web 24 by a gap G that is less than a maximum dimension(s) of the abrasive particles 36. Thus, a portion 36A of the applied abrasive particles 36c remains within the corresponding slot 62 and a portion 36B. The backing construction web 24 is driven relative to the distribution tool 50 in the machine direction 26, such that the applied abrasive particles 36c travel relative to the distribution tool 50 with movement of the backing construction web 24, freely sliding within the corresponding slot 62. During this movement, one or more of the walls 60 of the distribution tool 50 support the applied abrasive particles 36c, preventing the applied abrasive particles 36c from experiencing an overt change in spatial orientation (e.g., the applied abrasive particles 36c are preventing from overtly tipping or rotating in a direction perpendicular to the corresponding slot 62). Upon traveling beyond the exit side 92, the abrasive particles 36 are now more firmly bonded to the backing construction web 24 (e.g., abrasive particles 36d identified in FIGS. 7A and 7B), and maintain the gross biased orientation and alignment dictated by the distribution tool 50. In other words, systems and methods of the present disclosure include the applied abrasive particles 36c being in simultaneously contact with the backing construction web 24 and one (or more) of the walls 60 of the distribution tool 50 over a dwell period in which the applied abrasive particle 36c is caused to travel the length of the distribution tool 50 and progress beyond the exit side 92.

In some embodiments, some of the abrasive particles 36 included with the supply 40 dispensed or loaded on to the distribution tool will not experience the gross bias orientation and alignment sequence or steps described above. For example, as the supply 40 flows on to the distribution tool 50 at the entrance side 90, individual ones of the abrasive particles can defect or "bounce" off the walls 60 in a direction of the exit side 92; invariably, individual ones of the abrasive particles 36 will deflect or bounce off of the walls 60, beyond the exit side 92 and onto the backing construction web 24. FIG. 7B illustrates one example of a random abrasive particle 36e that has secured on to the backing construction web 24 without passing through one of the slots 62. Abrasive article manufacturers and end-users may prefer this random occurrence of non-biased abrasive particles 36e. Thus, systems and methods of the present disclosure include at least a majority, optionally at least 75%; 85%, 90% or 95%, of the abrasive particles 36 included with the supply 100 as loaded to the distribution tool 50 undergoing a particle orientation sequence in which the abrasive particle 36: 1) enters one of the slots 62; 2) passes partially through the corresponding slot 62 such that a first portion of the abrasive particle is beyond the lower side 64 and in contact with the major face 38 of the backing construction web 24 and a second portion is within the slot 62; and 3) remains in simultaneous contact with at least one of the walls 60 and the major face 38 for a dwell period in which the backing construction web 24 moves relative to the distribution tool 50. Less than 100% of the abrasive particles 36 included with the supply 40 as loaded onto the distribution tool 50 undergo the particle orientation sequence in some embodiments. As mentioned above, height H of supply 40 above distribution device 22 can be adjusted to reduce the occurrence of "bounce" and reduce the number of particles 36 that are misaligned as is particle 36e.

Exemplary Particle Configuration

Figure 12A:
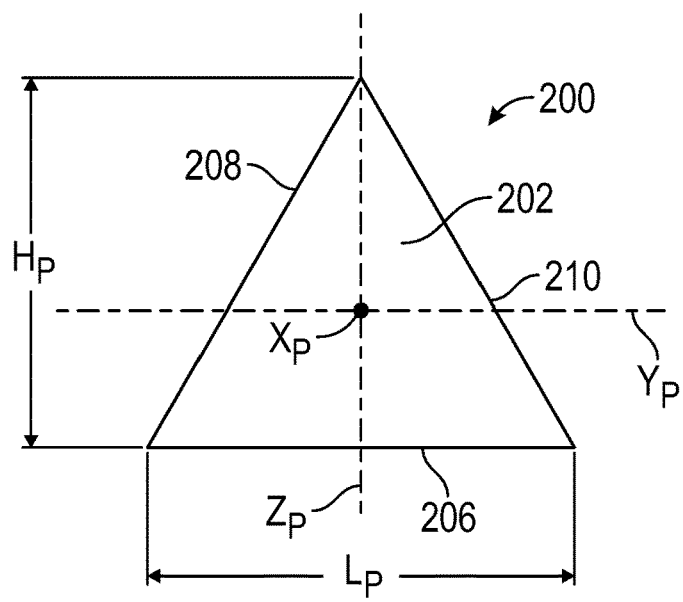
FIG. 12A is a top plan view of a triangular abrasive showing a length of the particle, the abrasive particle being useful with the tools, systems, and methods of the present disclosure.
Figure 12B:
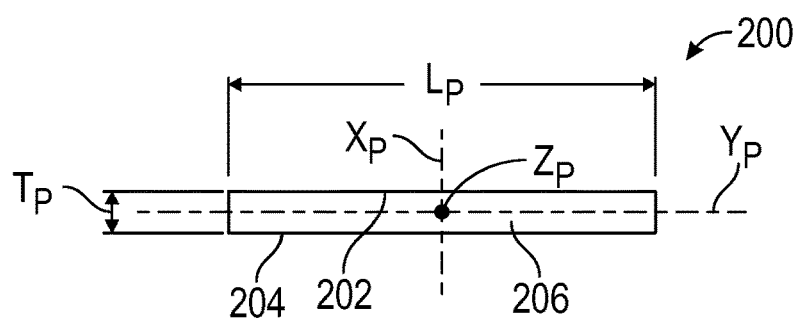
FIG. 12B is an end view of the triangular abrasive particle of FIG. 12A showing a thickness of the particle.
Figure 12C:
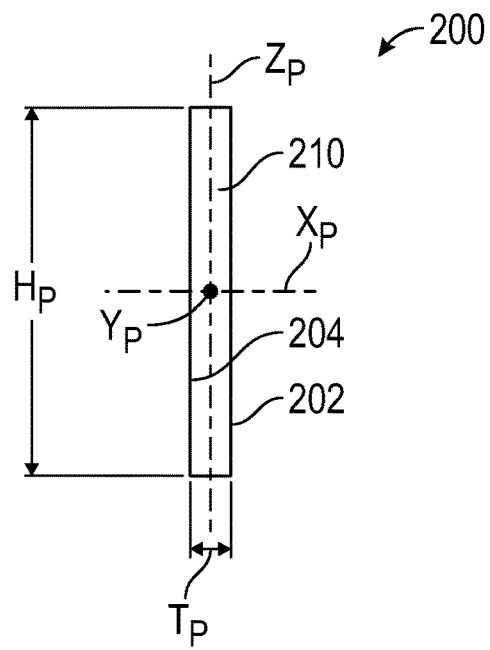
FIG. 12C is a side view of the triangular abrasive particle of FIG. 12A showing a height of the particle.

FIG. 12A is a top plan view of a triangular abrasive particle 200 useful with the tools, systems, and methods of the present disclosure. FIG. 12A shows a length of abrasive particle 200. FIG. 12B is an end view of the triangular abrasive particle 200 of FIG. 12A showing a thickness of the particle. FIG. 12C is a side view of the triangular abrasive particle 200 of FIG. 12A showing a height of the particle. In an example, particles 36 can comprise particles 200.

The gross biased orientation and alignment provided by distribution tools of the present disclosure can be characterized by reference to major axes and dimensions of the abrasive particle. FIGS. 1.2A-12C show a generic, non-limiting example of the abrasive particle 200, the exterior shape of which defines a particle maximum length, maximum height and maximum thickness $L_P$, $H_P$, $T_P$ dimensions that represent maximum dimensions of the abrasive particles 200 in three orthogonal planes. The particle maximum length, height and thickness $L_P$, $H_P$, $T_P$ are a function of a shape of the abrasive particle 200, and the shape may or may not be uniform. The present disclosure is in no way limited to any particular abrasive particle shape, dimensions, type, etc. However, with some shapes the "height" of the abrasive particle 200 may more conventionally be referred to as a "width".

The abrasive particle 200 is shown in FIGS. 12A-12C as arbitrarily having a triangle shape, with opposing major faces 204 (one of which is visible), opposing major side faces 202 (one of which is visible), and opposing minor side faces 206-210 (one of which is visible). Regardless of an exact shape, any abrasive particle can be described as providing the particle maximum length $L_P$ as the largest dimension in any one plane, the particle maximum height $H_P$ as being the largest dimension in any plane orthogonal to the plane of the maximum length $L_P$, and the maximum thickness $T_P$ as being the largest dimension in a third plane orthogonal to the planes of the maximum length $L_P$ and height $H_P$. The particle maximum length $L_P$ is greater than or equal to the particle maximum height $H_P$, and the particle maximum height $H_P$ is greater than or equal to the particle maximum thickness $T_P$. Abrasive particles useful with the present disclosure can have circular or spherical geometries such that the terms "length", "height" or "thickness" are inclusive of diameter.

A shape of the abrasive particle 200 is akin to an equilateral triangular prism, with FIG. 8A providing a top view, FIG. 8B an end view, and FIG. 8C a side view. Due to the equilateral triangular prism shape, the length and the heights of particle 200 are not uniform across a thickness of the abrasive particle 200 (i.e., the abrasive particle 200 can be viewed as defining opposing major faces 202, 204; the maximum length and height $L_P$, $H_P$ exist at both of the faces 202, 204). The maximum height $H_P$ is known or can be calculated, and can equal the maximum length $L_P$. The maximum thickness $T_P$ is less than the maximum length and height $L_P$, $H_P$. Side faces 206-210 of the abrasive particle 200 have an identical shape and size, and are perpendicular to the major faces 202, 204.

A shape of the abrasive particle 36 defines a centroid at which particle $X_P$, $Y_P$ and $Z_P$ axes can be defined (the particle $X_P$, $Y_P$ and $Z_P$ axes are orthogonal relative to one another). With the conventions of FIG. 12A-12C, the particle $Z_P$ axis is parallel with the maximum height $H_P$, the $Y_P$ axis is parallel with the maximum length $L_P$, and the $X_P$ axis is parallel with the maximum thickness $T_P$. As a point of reference, the particle $X_P$, $Y_P$, $Z_P$ axes are identified for the abrasive particle 200 as a standalone object independent of the backing construction web 24 (FIG. 1); once applied to the backing construction web 24, a "z-axis rotation orientation" of the abrasive particle 200 is defined by the particle's angular rotation about a z-axis passing through the particle and through the backing to which the particle is attached at a 90 degree angle to the backing.

The gross biased orientation effected by the distribution tools of the present disclosure entail dictating or limiting a spatial arraignment of the abrasive particle to a range of rotational orientations about the particle $Z_P$ axis and to a range of rotational orientations about the particle $Y_P$ axis; the gross biased orientation does not dictate or limit a rotational orientation about the particle $X_P$ axis. For example, FIG. 7B provides a top view of the abrasive particle 36c within one of the slots 62. The opposing walls 60 limit a rotational orientation of the abrasive particle 36 about the $Z_P$ axis to a range reflected by the spacing of walls 60. Similarly, FIG. 3B is an end view of the abrasive particle 36 within the slot 62. Gross biased orientation includes the opposing walls 60 limiting a rotational orientation of the abrasive particle 36 about the $Y_P$ axis within a range reflected by the spacing between walls 60. Finally, FIG. 7A is a side view of the abrasive particle 36 within the slot 62 (referenced generally) relative to one of the wall 60 (it being understood that the opposing wall of the slot 62 is not shown). The abrasive particle 36c can freely assume any rotational orientation about the $X_P$ axis (one possible rotational orientation about the $X_P$ axis is represented in FIG. 7A).

Depending upon the dimensions of the slot 62 and of the abrasive particle 36, the abrasive particle 36 may be able to "fit" within the slot 62 such that the particle $Y_P$ and $Z_P$ axes are rotated 90 degrees from the representations of FIGS. 7B and 3B in which the abrasive particle 36 is randomly arranged with the major side faces 106 parallel with the slot length $L_L$ and the minor side faces 108 parallel with the slot depth $D_L$.

With the above general explanations in mind and with reference between FIGS. 3A-3C and 7A and 7B, it will be recalled that dimensions of the walls 60 and the slots 62 are selected as a function of expected geometry or dimensions of the abrasive particles 36 to be processed. In more general terms, the dimensions of the walls 60 and the slots 62 are selected based upon the particle maximum length $L_P$, maximum height $H_P$, and maximum thickness $T_P$ of the abrasive particles to be processed (it being understood that a bulk supply of a particular abrasive particle will purport to contain identically sized and shaped abrasive particles; invariably, however, individual ones of the abrasive particles within the bulk supply will have dimensions that slightly vary from one another within an accepted tolerances; thus, when selecting dimensions for the walls 60 and the slots 62 for distributing the abrasive particles of the bulk supply as described in the present disclosure, the "dimensions" of any one abrasive particle of the bulk supply can be with reference to nominal dimension of the bulk supply).

Dimensions of the walls 60 and the slots 62 are generally configured such that the slot width $W_L$ is less than at least the abrasive particle maximum length $L_P$, and optionally less than the abrasive particle maximum height $H_P$, dictating that the abrasive particle 36 must achieve a gross biased orientation before entering and passing through one of the slots 62, with the walls 60 further serving to support the abrasive particle 36 in the biased orientation as described below. While the slot width $W_S$ can closely approximate the maximum thickness $T_P$ so as to dictate a more precise particle $Z_P$ axis and $Y_P$ axis rotation orientation of the applied abrasive particles 36 (i.e., as the slot width $W_L$ approaches the maximum thickness $T_P$, the range of possible $Z_P$ axis and $Y_P$ axis rotational orientations the abrasive particle 36 can assume and still "fit" in the slot 62 is reduced), in some embodiments, the slot width $W_L$ is greater than the maximum thickness $T_P$ for enhanced throughput time (i.e., by providing a larger slot width $W_L$, abrasive particles 36 can randomly assume a larger range of $Z_P$ axis and $Y_P$ axis rotational orientations and still enter/pass through one of the slots 62, thereby making it "easier" for an individual abrasive particle 36 to obtain an appropriate spatial orientation and improving the mass flow rate of the abrasive particles 36 through the distribution tool 50), approaching, but not exceeding, the particle maximum length and maximum height $L_P$, $H_P$. For example, the slot width $W_L$ can be 50-75% of the maximum height $H_P$ (so long as the calculated value is greater than the maximum thickness $T_P$). In yet other embodiments, the selected slot width $W_L$ is a non-integer factor of the maximum thickness $T_P$ (i.e., the slot width $W_L$ is not equal to the maximum thickness $T_P$, $2T_P$, $3T_P$, etc.) to avoid clogging (e.g., were the slot width $W_L$ to be equal to two times the maximum thickness $T_P$, two abrasive particles 36 could become aligned side-by-side each other and then collectively become lodged to the opposing walls 60 of one of the slots 62). With optional embodiments incorporating the alternating height walls 60, a width between an adjacent pair of the taller walls can be selected to be greater than the particle maximum length $L_P$ and maximum height $H_P$. With this design criteria, a single abrasive particle 36 cannot span two "high" points (e.g., the second ends 82 of an adjacent pair of the taller walls 60), greatly increasing the mass flow of the abrasive particles 36 through the distribution tool 50.

Dimension of the walls 66 and the slots 67 are generally configured such that the slot width $W_U$ is greater than the largest dimension of particle 36 in order to facilitate particles 36 passing through slots 67. That is, unlike slots 62, slots 67 are not so much concerned with spatially orientating particles 36 into a three-dimensional orientation in space, but are rather concerned with spacing particles in two-dimensional space along machine direction 26. Thus, the greater slot width $W_U$, the larger rows R (FIG. 2C) will be. For example, each row R can be configured to include multiple particles 36 in the direction of machine direction 26. The smaller slot width $W_U$ is, the tighter rows R will be, as small as to allow only a single particle 36. In general, it is desirable to allow particles to pass through slots 67 with little resistance from walls 66. In a similar theme, the greater the thickness $T_U$ (FIG. 3C) of walls 66, the greater the spacing $S_P$ (FIG. 2C) between rows R of particles 36 will be. The smaller the thickness $T_U$ is, the smaller spacing SP between rows R will be.

The slot depth, as determined by wall height $H_L$ (FIG. 3B), is selected to approximate or be greater than at least the particle maximum height $H_P$ (or particle maximum length $L_P$ where the shape of the particular abrasive particle does not implicate a height differing from a length) so as to better ensure that individual ones of the abrasive particles 36 attain the desired gross biased orientation and are supported in this orientation as they traverse the corresponding slot 62. Thus, the wall height $H_L$ is at least equal to the maximum particle height $H_P$ in some embodiments. Where the walls 60 have differing heights (e.g., with the non-limiting embodiment where the height of one sub-set of walls 60 is less than the height of a second sub-set of walls 60), the height of the shortest wall 60 is at least equal to the maximum height $H_P$ in some embodiments. In other constructions, the slot depth can be less than the maximum particle height $H_P$.

Dimensions of the abrasive particles 36 can also be utilized to determine a size of the gap G between the lower side 64 of the distribution tool 50 and the backing construction web 24 as shown in FIG. 7A. In particular, the gap G is sized so as to ensure that once in contact with the backing construction web 24, a portion of the abrasive particle 36 remains "within" the corresponding slot 62 (referenced generally in FIG. 7B, it being understood that in the view of FIG. 7A, the slot 62 is "hidden" behind the wall 60 otherwise visible in the illustration), supported by at least one of the corresponding walls 60. In some embodiments, the size of the gap G is 25-90% of the particle maximum height $H_P$, alternatively 50-75% of the particle maximum height $H_P$. For example, in the illustration of FIG. 7A, the abrasive particle 36c has achieved the gross biased orientation dictated by the distribution tool 50, fallen along one of the slots 62, and become arranged on the backing construction web 24. Because the gap G is less that the particle maximum height $H_P$, a first portion 36A of the abrasive particle 36c remains within the slot 62, and a second portion 36B is beyond the lower side 64. Thus, the abrasive particle 36c is supported by at least one of the walls 60 (i.e., the first portion 36A contacts at least one of the walls 60) as the abrasive particle 36c traverses along the distribution tool 50 with movement of the backing construction web 24 in the machine direction 26. In other embodiments, the lower side 64 can be located in even closer proximity to the backing construction web 24, including being in contact with the major face 38.

Drum Embodiment

Figure 8:
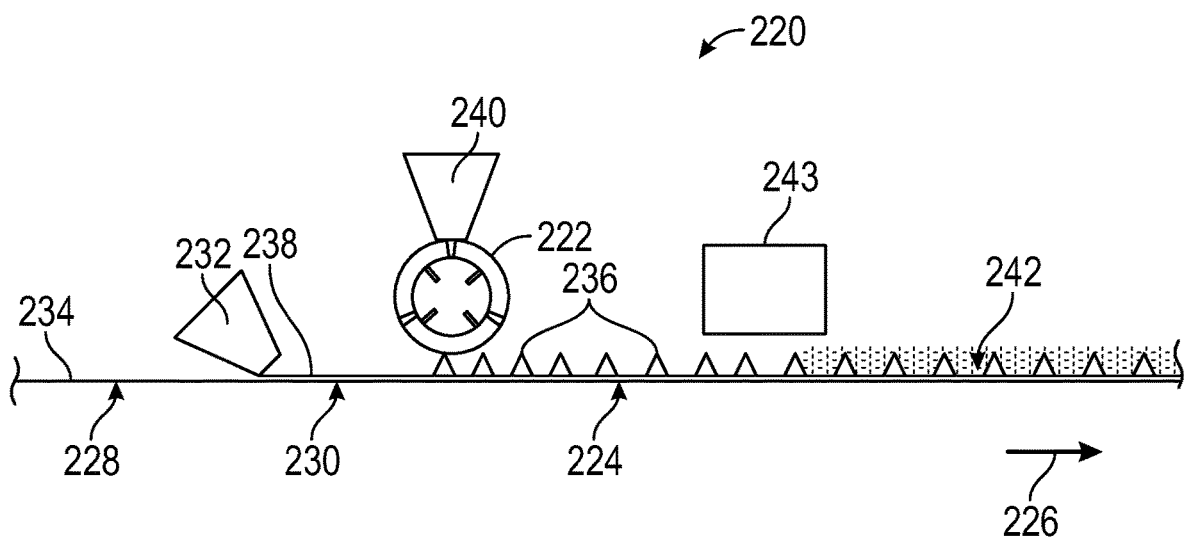
FIG. 8 is a simplified illustration of a portion of a system for manufacturing abrasive articles in accordance with principles of the present disclosure, the system including a distribution tool having a plurality of spacer walls disposed within a plurality of distribution rings.
Figure 9:
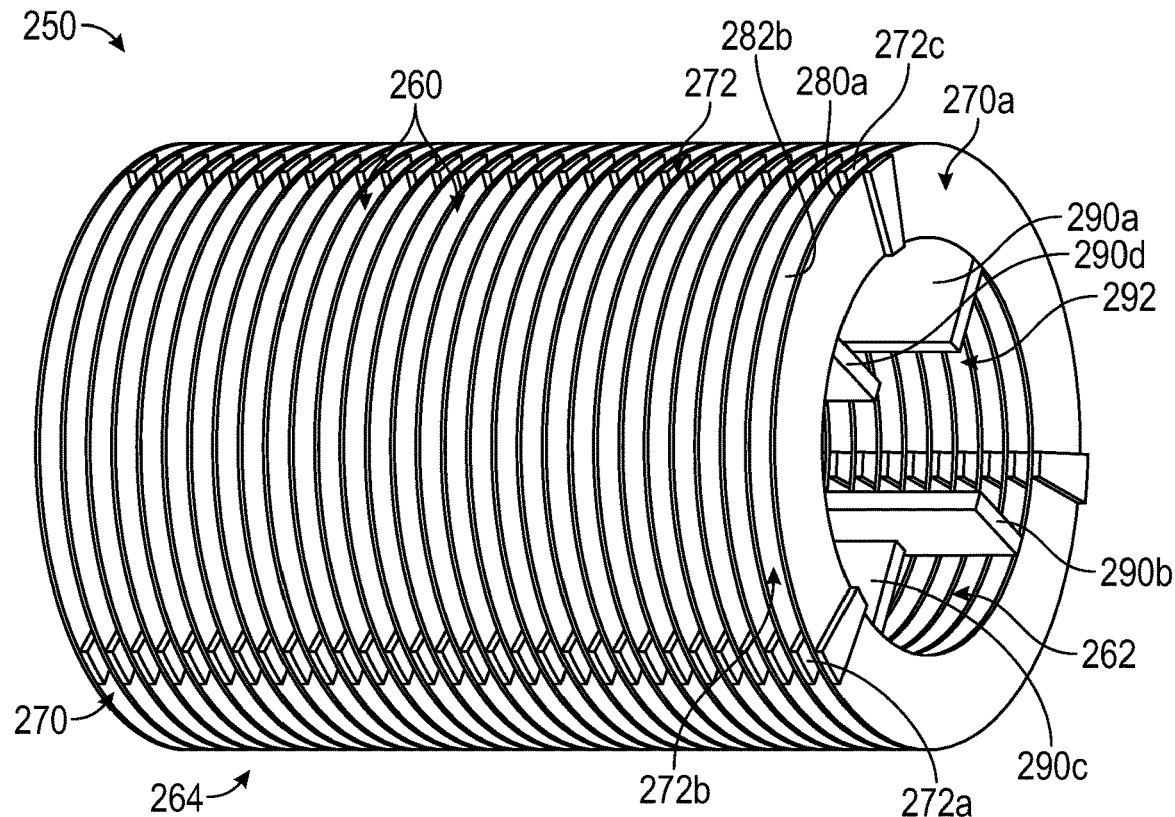
FIG. 9 is a perspective view of the distribution tool of FIG. 8 showing aligned rings and crisscrossing walls.

FIG. 8 is a simplified illustration of a portion of system 220 for manufacturing abrasive articles in accordance with principles of the present disclosure, the system including a distribution device 222 having a grid of a plurality of rings 270 (FIG. 9) and walls 290 (FIG. 9) disposed above a conveyor. FIG. 9 is a perspective view of the distribution device 222 of FIG. 8 showing the aligned rings 270 and crisscrossing walls 290, FIG. 10 is a side view of the distribution device 222 of FIG. 9 showing a plurality of crisscrossing walls 290 disposed in the aligned rings 270.

FIG. 8 illustrates portions of a system 220 for manufacturing abrasive articles in accordance with principles of the present disclosure, including a distribution device 222 along with other components or devices commonly employed in the manufacture of abrasive articles. For example, the manufacture of abrasive articles conventionally includes structures and mechanisms e.g. rollers, conveyor belts, etc.) for moving a backing construction web 224 along a path of travel or machine direction 226. The backing construction web 224 can assume various forms, and in some embodiments includes a backing 228 to which a make coat precursor resin 230 (or other resin or adhesive) has been applied. For example, with the non-limiting arrangement of FIG. 8, the backing 228 is advanced past a coater 232 that applies the make coat precursor resin 230 on a major surface 234 of the backing 228 thereby creating the backing construction web 224 (e.g., a coated backing). In other embodiments, multiple coatings can be applied to the backing 28 to generate the backing construction web 224 as delivered to the distribution device 222; in yet other embodiments, the backing construction web 224 consists of the backing 228 alone (i.e., prior to interacting with the distribution device 222, the backing 228 is not subjected to a resin coating operation). Abrasive particles 236 (a size of which is exaggerated in FIG. 8 for ease of understanding) are applied to a major face 238 of the backing construction web 224 by the distribution device 222 that otherwise distributes the abrasive particles 236 from a source 240 as described below. After application of the abrasive particles 236, the backing construction web 224 exits the distribution device 222 and is optionally subjected to further processing (e.g., application of a size coat 242, application of additional abrasive particles by conventional means (e.g., e-coat), application of a grinding aid, application of a supersize coat, curing, cutting, etc.) to produce a final abrasive article, such as a coated abrasive article.

System 220 operates in a similar fashion as system 20 of FIG. 1, except distribution device 222 comprises a drum member rather than a plurality of stacked tooling layers of walls and slots, as discussed with reference to FIG. 1-3C. Distribution device 222 can comprise a slotted drum that functions similarly to lower tooling layer formed by walls 60 in FIG. 3A. A plurality of walls can be positioned within the drum to function similarly to an upper tooling layer formed by walls 66 in FIG. 3A.

Figure 10:
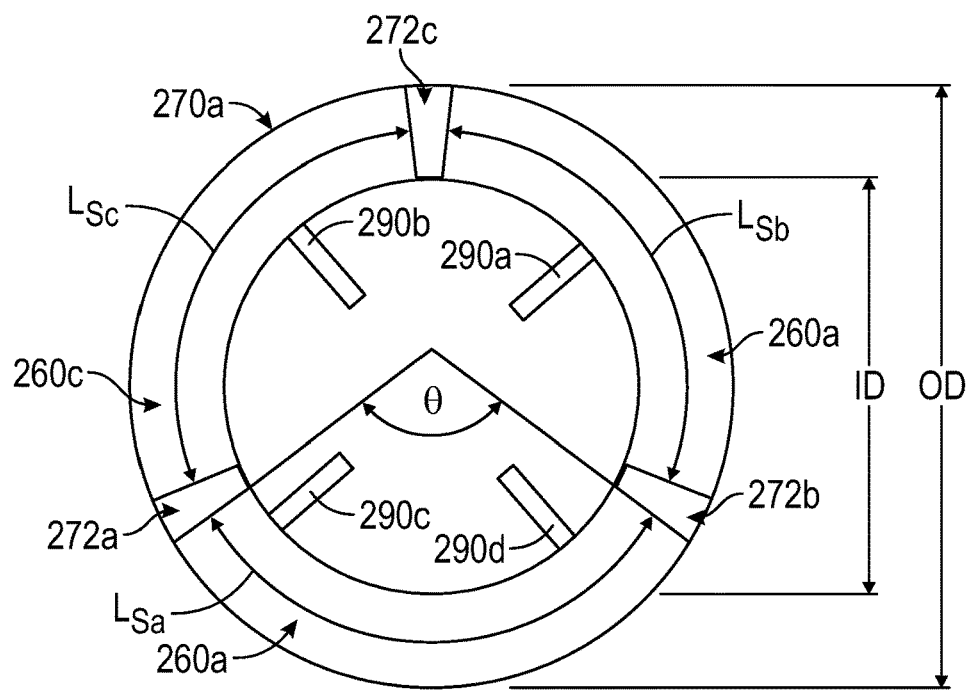
FIG. 10 is a side view of the distribution tool of FIG. 9 showing a plurality of crisscrossing walls disposed within an aligned rings.

With reference to FIGS. 9 and 10, the distribution device 222 is configured to effectuate gross biased orientation and alignment of at least a majority of the abrasive particles 236 as applied and subsequently bonded to the major face 238. With this in mind, portions of one embodiment of a distribution tool 250 in accordance with principles of the present disclosure and useful with or as the distribution device 222 (FIG. 8) are shown in simplified form in FIGS. 9 and 10. In general terms, the distribution tool 250 has a generally cylindrical shape, for example akin to a hollow right cylinder, and defines a plurality of slots 260 using, for example, rings 270. The slots 260 are each open to an exterior of the distribution tool 250. The distribution tool 250 can have or define a central bore 262 in some embodiments; where provided, each of the slots 260 are also open to the central bore 262. Regardless, the distribution tool 250 is configured to distribute abrasive particles (not shown) at a lower side 264 (referenced generally in FIG. 9) thereof in a manner that grossly orients and aligns the abrasive particles. For example, the slots 260 extend in a circumferential direction of the cylindrical shape and each have a substantially similar width $W_S$ (e.g., the width $W_S$ of the slots 260 varies from one another by no more than 10%) that is selected in accordance with expected nominal dimensions of the abrasive particles so as to grossly bias the abrasive particles to a spatial orientation at the lower side 264.

Distribution tool 250 can also include cross-pieces 290a-290d that can be positioned inside central bore 262. In various embodiments, cross-pieces 290a-290d can be positioned perpendicular to the orientation of slots 260. In other embodiments, cross-pieces 290a-290d can be positioned in other orientation oblique to the orientation of slots 260. Cross-pieces 290a-290d are configured to space the distribution of particles 236 along major face 238 by controlling the ability of particles 236 to enter slots 260.

The distribution tool 250 can be constructed in various manners, and in some embodiments includes a plurality of aligned rings 270 and a plurality of cross-pieces 290. Size, shape and dimensions of the rings 270 can be substantially identical (e.g., the size, shape and dimensions of each of the rings 270 varies from one another by no more than 10%), and the rings 270 can be constructed of a rigid, robust material such as metal, plastic, etc. Size, shape and dimensions of the cross-pieces 290 can be substantially identical (e.g., the size, shape and dimensions of each of the cross-pieces 290 varies from one another by no more than 10%), and the cross-pieces 290 can be constructed of a rigid, robust material such as metal, plastic, etc.

Immediately adjacent ones of the rings 270 are maintained relative to one another in a spaced apart fashion by one or more spacer bodies 272 so as to generate one or more of the slots 260. For example, FIG. 10 illustrates ring 270a and three of the spacer bodies 272 (identified as 272a-272c). The spacer bodies 272 can be provided apart from the rings 270; in other embodiments, the spacer bodies 272 are integrally formed with a corresponding one of the rings 270. Upon final assembly, the spacer bodies 272 are attached to or otherwise extend between a trailing face 280a of the first ring 270a, and a leading face 282b (FIG. 9) of the second ring 270b. In this regard, FIG. 9 illustrates the spacer bodies 272a-272c as assembled to (or integrally formed with) the trailing face 280a of the first ring 270a (it being understood that the second ring 270b will be assembled on to the spacer bodies 272, mirroring the shape and arrangement of the first ring 270a). The spacer bodies 272a-272c can be equidistantly spaced from one another (relative to a circumference of the ring 270a), and can have substantially identical dimensions (e.g., within 10% of truly identical dimensions) optionally selected so as to extend entirely to and between inner and outer diameters ID, OD of the ring 270a. While three of the spacer bodies 272 are shown, in other embodiments, immediately adjacent ones of the rings 270 (FIG. 10) can be connected by a greater or lesser number of spacer bodies 272. Further, the spacer bodies 272 need not be equidistantly spaced.

Rings 270 of distribution device 222 can be configured similarly as those described in greater detail in U.S. Provisional Patent Application No. 62/190,046 to Liu et al. (filed Jul. 8, 2015), the content of which is hereby incorporated by this reference in its entirety. As such, distribution device 222 is similar to the distribution device described in the '046 application to Liu et al. with the addition of cross-pieces 290. As discussed above with reference to distribution device 22, cross-pieces 290 can be configured to control entry of particles into rings 270.

Cross-pieces 290 can be attached to rings 270 in any suitable manner. For example, cross-pieces 290 can be attached to rings 270 via an adhesive or metallurgical bond. Cross-pieces 290 can also be attached via fasteners (not shown). For example, each end of a cross-piece 290 can be directly attached to a face of a ring 270 at an end of distribution device 222. Additionally end rings having inner diameters smaller than rings 270 can be attached to the ends of distribution device 222 to hold cross-pieces 290 in place. Cross-pieces 290 can thus be positioned in place at a desired interval or spacing. Additionally, other components may be included in distribution device 222 to maintain spacing between cross-pieces 290. For example, arcuate spacers may be positioned between adjacent cross-pieces 290. Thus, in the depicted embodiment with the cross-pieces 290, four arcuate spacers could be placed to alternate with the cross-pieces 290 proximate each end of the cross-pieces 290.

Figure 11:
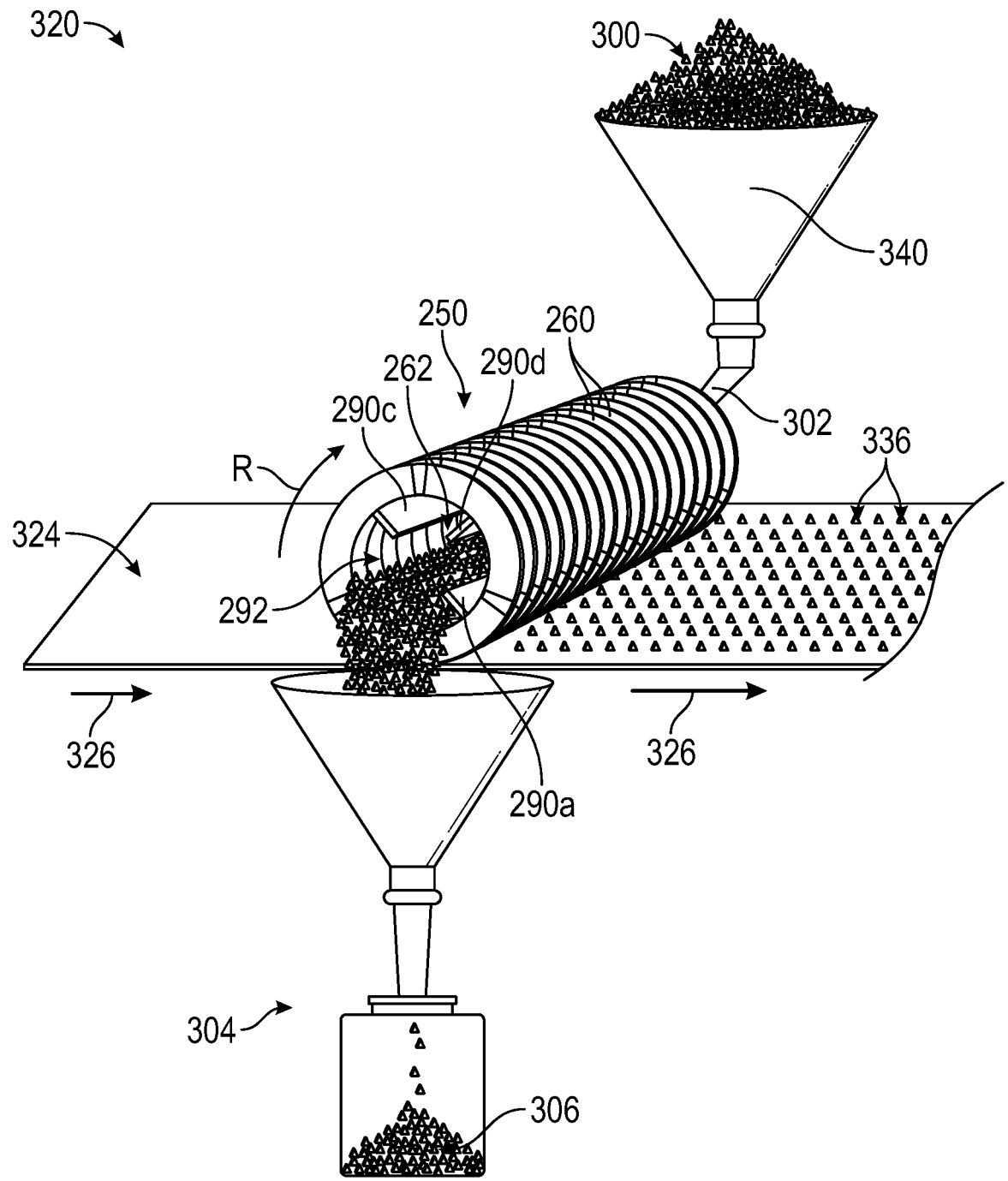
FIG. 11 is a perspective view of the distribution tool of FIGS. 8-10 as part of a system for manufacturing abrasive articles and distributing abrasive particles on to a web.

FIG. 11 is a perspective view of the distribution tool 250 of FIGS. 8-10 as part of a system 320 for manufacturing abrasive articles and distributing abrasive particles 336 on to a web.

Incorporation of the distribution tool 250 as part of the abrasive article manufacturing system 320 is generally reflected by FIG. 11. The distribution tool 250 is located immediately adjacent (e.g., slight above by a distance described in greater detail below) the backing construction web 324. Further, the distribution tool 250 is configured and arranged relative to the backing construction web 324 such that the slots 260 (referenced generally) optionally are substantially aligned (e.g., within 10% of a truly aligned relationship) with the machine direction 326. Cross-pieces 290 are arranged substantially perpendicular to the machine or travel direction 326 such that each of the slots 292 is substantially perpendicular (e.g., within 10% of a truly perpendicular relationship) or oblique to the machine direction 326. Other arrangements are also envisioned, such as the slots 260 being arranged substantially perpendicular to the machine or travel direction 326 and slots 292 being substantially parallel.

During use, a supply 300 (referenced generally) of the abrasive particles 336 is loaded to the distribution tool 250 via the source 340. For example, the source 340 can be akin to a mineral dropper having an outlet 302 (referenced generally) that extends into the central bore 262. The supply 300 of the abrasive particles 336 flows through the outlet 302 and into the central bore 262. Once within the central bore 262, individual ones of the abrasive particles 336 will enter a respective one of the slots 292 formed by cross-pieces 290. Slots 292 can space abrasive particles 336 along rings 270 to provide an interruption in distribution of abrasive particles 336 to backing construction web 324. After passing through slots 292, the abrasive particles 336 will enter a respective one of the slots 260 only upon achieving a gross spatial orientation dictated by dimensions of the slots 260.

As a point of reference, loading of the supply 300 can include pouring or funneling (e.g., via vibratory feeder, belt driven drop coater, etc.) a large number of the abrasive particles 336 on to (or into) the distribution tool 250 under the force of gravity, with individual ones of the so-loaded abrasive particles 336 randomly assuming any spatial orientation. As the individual abrasive particles 336 repeatedly contact one or more of the rings 270, they deflect and assume a new spatial orientation, eventually becoming generally aligned with and assuming a spatial orientation appropriate for entering one of the slots 260. In this regard, as the supply 300 of the abrasive particles 336 flows into the distribution tool 250, the distribution tool 250 is rotated (e.g., via a rotation device (not shown) connected to the distribution tool 250); with this rotation (indicated by the arrow R in FIG. 11), the abrasive particles 336 mix and/or vibrate around on surfaces of the distribution tool 250 until they obtain a suitable orientation and fall through one of the slots 260. Regardless, a large number of abrasive particles 336 can be disposed within individual one of the slots 260 at any one point in time.

In some embodiments, some of the abrasive particles 336 included with the supply 300 dispensed or loaded into the distribution tool 250 will not become correctly oriented or are otherwise prevented from entering one of the slots 260. As the supply 300 continuously flows into the distribution tool 250, then, a percentage of the so-loaded abrasive particles 336 will flow or pass through the distribution tool 250. As shown in FIG. 11, a collection unit 304 is optionally provided for collecting an excess 306 of the abrasive particles 336.

Exemplary Results

Figure 13:
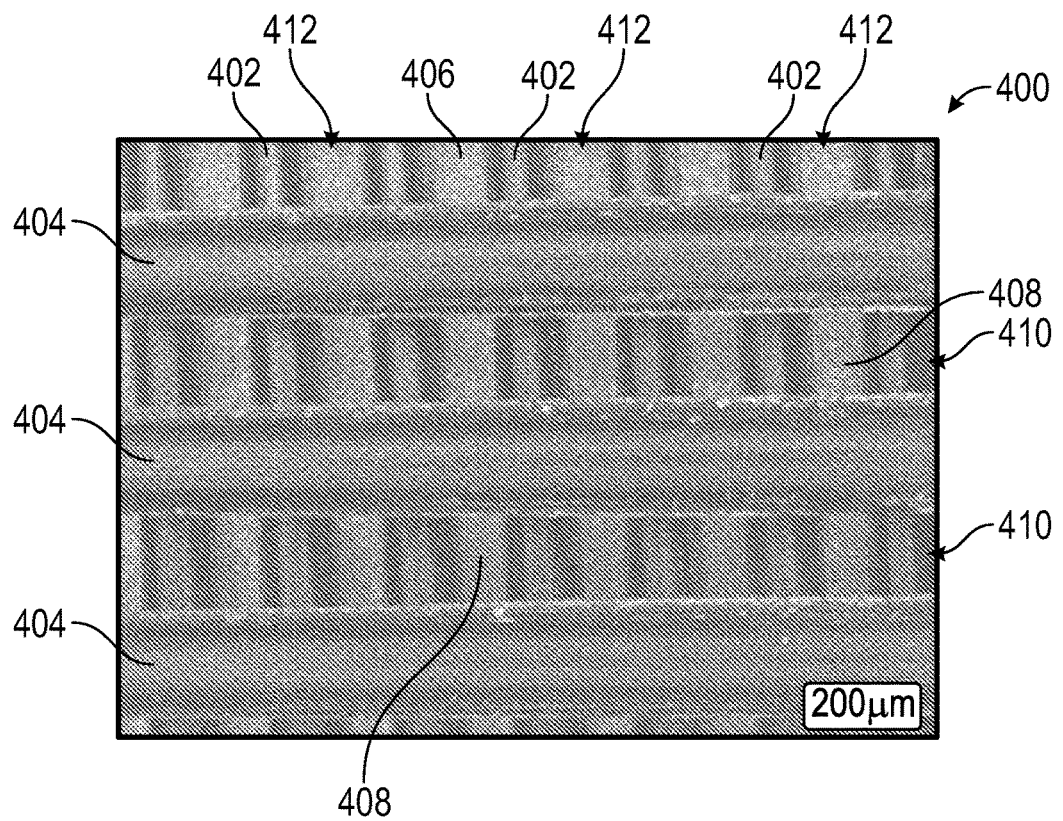
FIG. 13 is an illustration of a two-layer tooling system having bottom orientation walls and top distribution walls.

FIG. 13 is an illustration two-layer tooling system 400 having bottom orientation walls 402 and top distribution walls 404. Two-layer tooling system 400 is disposed above backing 406. As shown, walls 402 and walls 404 form chutes 408 through tooling system 400. Chutes 408 are formed by slots 410 through walls 404 and slots 412 through walls 402. Slots 410 can cause particles 436 (FIG. 14) to drop into slots 412 at intervals having a length approximating the thickness of walls 404. After passing through slots 410, walls 402 only allow particles 436 to pass into slots 412 in a preferred orientation.

Figure 14:
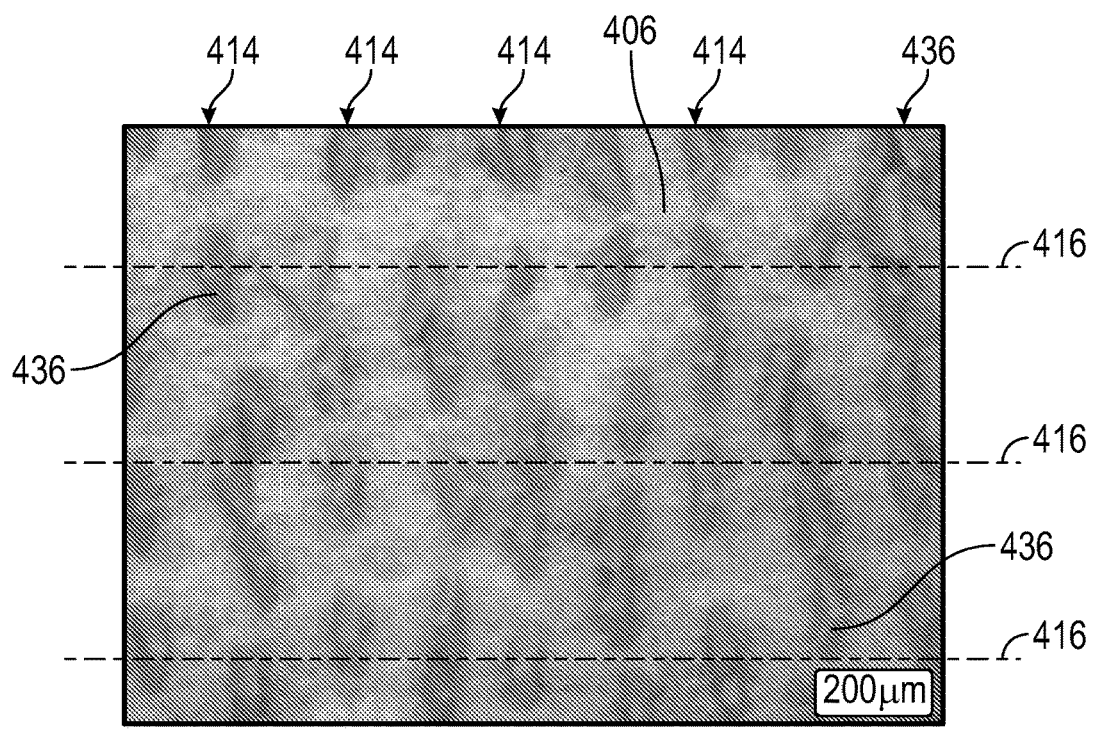
FIG. 14 is an illustration of abrasive particles distributed on a backing via the two-layer tooling system of FIG. 13.

FIG. 14 is an illustration of particles 436 distributed on backing 406 via two-layer tooling system 400 of FIG. 13. Chutes 408 of walls 402 and walls 404 are configured to position particles 436 in columns 414 at intervals 416. As can be seen, particles 436 in columns 414 all have the same general orientation where the major plane of each particle 436 is oriented in the direction of slots 412. Each column 414 is spaced apart by a distance that is approximately equal to the thickness of each wall 402. As can be seen, particles 436 in intervals 416 have a spacing such that large clusters of particles 436 in each column 414 are reduced or avoided. In other words, particles 436 in each column 414 are spaced at intervals to eliminate or reduce the occurrence of multiple particles 436 being next to each other in a single column 414.

As evidenced by the above explanations, the distribution tools of the present disclosure are useful with a plethora of abrasive particle shapes, such as any precision shaped grain currently available or in the future developed. Non-limiting examples of other precision shaped grains or abrasive particles useful with the present disclosure include those described in U.S. Patent Application Publication No. 2009/0169816 entitled "Shaped, Fractured Abrasive Particle, Abrasive Article Using Same and Method of Making"; U.S. Patent Application Publication No. 2010/0146867 entitled "Shaped Abrasive Particles With Grooves"; U.S. Patent Application Publication No. 2010/0319269 entitled "Shaped Abrasive Particles With Low Roundness Factor"; U.S. Patent Application Publication No. 2012/0227333 entitled "Dual Tapered Shaped Abrasive Particles"; U.S. Patent Application Publication No. 2013/0040537 entitled "Ceramic Shaped Abrasive Particles, Methods of Making the Same, and Abrasive Articles Containing the Same"; and U.S. Patent Application Publication No. 2013/0125477 entitled "Intersecting Plate Shaped Abrasive Particles"; the entire teachings of each of which are incorporated herein by reference.

In addition, the tools, systems and methods of the present disclosure are also useful with more abstract or complex abrasive particle shapes (e.g., shards).

Regardless of shape, the tools, systems and methods of the present disclosure are useful with a wide range of abrasive particle materials. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. The abrasive particles may be in the form of for example, individual particles, agglomerates, abrasive composite particles, and mixtures thereof.

Returning to FIG. 1, apart from the distribution tool 50 (and other optional components of the distribution device 22) and use thereof other features of the abrasive article manufacturing systems and methods of the present disclosure can assume a wide variety of forms as are known in the art.

For example, the backing 28 can be a flexible backing. Suitable flexible backings include polymeric films, metal foils, knitted fabrics, paper, vulcanized fiber, nonwovens, foams, screens, laminates, and combinations thereof. The coated abrasive articles with a flexible backing may be in the form of sheets, discs, belts, pads, or rolls. In some embodiments, the backing 28 can be sufficiently flexible to allow the coated abrasive article to be formed into a loop to make an abrasive belt that can be run on suitable grinding equipment.

The make coat 30 and, where provided, the size coat 42 comprise a resinous adhesive. The resinous adhesive of the make coat 30 can be the same as or different from that of the size coat 42. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 30 or size coat 42, or both coats, may further comprise additives that are known in the art, such as, for example, fillers, grinding agents, wetting agents, surfactants, dyes, pigments, coupling agents, adhesion promoters, and combinations thereof. Examples of fillers include calcium carbonate, silica talc, clay, calcium metasailicate, dolomite, aluminum sulfate and combinations thereof.

The distribution tools and corresponding abrasive article manufacturing systems and methods of the present disclosure provide a marked improvement over previous designs. Abrasive particles are randomly loaded on to the distribution tool. In passing through the distribution tool and becoming applied to a backing, the abrasive particles are caused to become grossly spaced, grossly oriented and aligned, with minimal costs and restrictions on through put time. Further, the distribution tool supports the spaced, oriented and aligned abrasive particles for a dwell period, enhancing the likelihood that the abrasive particles will retain the biased orientation. The distribution tools of the present disclosure are useful with any type or shape of abrasive particle, especially abrasive particles that are not well-suited for electrostatic coating.

Although the present disclosure has been described with reference to preferred embodiments, workers skilled in the art will recognize that changes can be made in form and detail without departing from the spirit and scope of the present disclosure.

What is claimed is:

1. A method for making an abrasive article comprising:
   loading abrasive particles to a distribution tool, the distribution tool including:
      a plurality of first walls defining a plurality of first slots, each of the first slots being open to a lower side of the distribution tool; and
      a plurality of second walls defining a plurality of second slots, each of the second slots being open to an upper side of the plurality of second walls;
   spacing abrasive particles loaded into the distribution tool using the plurality of second walls;
   wherein at least a majority of the abrasive particles loaded into the distribution tool undergo a particle spacing sequence in which each abrasive particle of the at least a majority of abrasive particles:
      a) enters one of the plurality of second slots, and
      b) passes through the corresponding second slot spaced from abrasive particles in an adjacent second slot; and
   distributing abrasive particles from the distribution tool on to a major face of a backing construction web located immediately below the lower side of the distribution tool and moving relative to the distribution tool;
   wherein at least a majority of the abrasive particles distributed from the distribution tool undergo a particle orientation sequence in which each abrasive particle of the at least a majority of abrasive particles:
      a) enters one of the plurality of first slots,
      b) passes partially through the corresponding first slot such that a first portion of the abrasive particle is beyond the lower side and in contact with the major face, and a second portion of the abrasive particle is within the first slot, and
      c) remains in simultaneous contact with at least one of the first walls and the major face for a dwell period during which the web moves relative to the distribution tool.

2. The method of claim 1, wherein the step of spacing abrasive particles includes a plurality of the abrasive particles simultaneously within a respective one of the second slots.

3. The method of claim 1, wherein the step of distributing abrasive particles includes a plurality of abrasive particles simultaneously in contact with the major face and a first one of the walls as part of the corresponding orientation sequence.

4. The method of claim 1, wherein the steps of spacing and distributing abrasive particles includes vibrating the distribution tool.

5. The method of claim 4, wherein the distribution tool is vibrated in line with a machine direction of the moving web.

6. The method of claim 1, wherein the step of loading abrasive particles includes continuously loading abrasive particles to the distribution tool.

7. The method of claim 1, wherein each of the plurality of first slots defines a length greater than a width and a depth, and further wherein the distribution tool is arranged such that a direction of the length of each of the first slots is substantially parallel with a machine direction of the moving web.

8. The method of claim 7, wherein each of the first slots extends in a length direction from an entrance side of the distribution tool to an exit side of the distribution tool, the entrance side being located upstream of the exit side relative to the machine direction of the moving web, and further wherein the step of loading includes directing the abrasive particles to the entrance side after passing through the plurality of second walls.

9. The method of claim 7, wherein each of the plurality of second slots defines a second length greater than a second width and a second depth, the second width being greater than a largest dimension of one of the abrasive particles.

10. The method of claim 7, wherein the distribution tool is arranged such that a direction of the second length of each of the second slots is substantially perpendicular with the machine direction of the moving web.

11. The method of claim 7, wherein the distribution tool is arranged such that a direction of the second length of each of the second slots is oblique to the machine direction of the moving web.

12. The method of claim 11, wherein the distribution tool is arranged such that a direction of the second length of each of the second slots is arranged at an angle to the machine direction of the moving web, the angle being greater than zero and up to 90 degrees.

13. The method of claim 1, wherein each of the second walls includes a pointed upper portion having an edge configured to prevent abrasive particles from resting on top of each of the second walls.

14. The method of claim 13, wherein the upper edge guides abrasive particles to either a first side or a second side of a respective second wall.

15. The method of claim 1, wherein each of the first walls includes a pointed upper portion having an edge configured to prevent abrasive particles form bridging adjacent first walls.

16. The method of claim 1, wherein adjacent second walls have different sizes.

17. The method of claim 1, wherein following the step of distributing abrasive particles from the distribution tool, the distributed particles are free of contact with the distribution tool, the method further including at least some of the distributed abrasive particles tilting relative to the major face due, at least in part, to gravity.

18. The method of claim 1, wherein the backing construction web includes a make coat along a major surface of a backing.

19. A system for making an abrasive article comprising:
a distribution tool including:
  a plurality of upper walls defining a plurality of spacing slots having an entrance side and a lower side; and
  a plurality of lower walls defining a plurality of distribution slots having an upper side and an exit side; and
  wherein the upper side of the lower walls face the lower side of the upper walls;
a web feeding device configured to manipulate a backing construction web in a machine direction immediately below the exit side of the distribution tool;
wherein each of the distribution slots defines a first length substantially parallel to the machine direction; and
wherein each of the spacing slots defines a second length oblique to the machine direction.

20. The system of claim 19, wherein the second length is substantially orthogonal to the machine direction.

21. The system of claim 19, wherein each of the distribution slots also defines a first depth, and a first width substantially orthogonal to the first length, the first length being greater than the first depth, and the first depth being greater than the first width.

22. The system of claim 19, wherein each of the spacing slots also defines a second depth, and a second width substantially orthogonal to the second length, the second length being greater than the second depth, and the second depth being greater than the second width.

23. The system of claim 19, wherein each of the plurality of upper walls includes an upper portion including a first angled surface.

24. The system of claim 23, wherein the upper portion includes a second angled surface connected to the first angled surface to define an edge at an uppermost point of each upper wall.

25. The system of claim 19, wherein adjacent upper walls have different heights.

26. The system of claim 19, further comprising:
a vibration device connected to the distribution tool for vibrating the distribution tool.

27. The system of claim 19, further comprising:
an abrasive particle feed device having an outlet end arranged adjacent to the entrance side.

28. The system of claim 27, wherein the outlet end of the abrasive particle feed device is spaced from the entrance sides of the plurality of upper walls.

29. The system of claim 19, wherein the distribution tool comprises a drum.

30. The system of claim 19, wherein the distribution tool comprises a stacked grid.

* * * * *